(12) United States Patent
Kuraoka

(10) Patent No.: US 8,873,357 B2
(45) Date of Patent: Oct. 28, 2014

(54) RECORDING MANAGEMENT APPARATUS, RECORDING MANAGEMENT METHOD, AND PROGRAM

(71) Applicant: Sony Corporation, Tokyo (JP)

(72) Inventor: Tomotaka Kuraoka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/917,686

(22) Filed: Jun. 14, 2013

(65) Prior Publication Data

US 2013/0343170 A1    Dec. 26, 2013

(30) Foreign Application Priority Data

Jun. 22, 2012   (JP) ................................ 2012-140793

(51) Int. Cl.
*G11B 7/00* (2006.01)
*G11B 7/007* (2006.01)
*G11B 27/32* (2006.01)
*G11B 7/2405* (2013.01)

(52) U.S. Cl.
CPC .............. *G11B 7/007* (2013.01); *G11B 27/329* (2013.01); *G11B 7/2405* (2013.01); *G11B 2007/0013* (2013.01)
USPC ..................................................... 369/47.37

(58) Field of Classification Search
None
See application file for complete search history.

(56) References Cited

U.S. PATENT DOCUMENTS

| 6,671,238 | B1 * | 12/2003 | Ko et al. ...................... 369/47.1 |
| 7,339,868 | B2 * | 3/2008 | Suzuki ......................... 369/53.2 |
| 7,423,952 | B2 * | 9/2008 | Shishido et al. ................ 369/94 |
| 2003/0163638 | A1 * | 8/2003 | Sasaki ........................... 711/112 |
| 2004/0264322 | A1 * | 12/2004 | Shishido et al. ........... 369/47.22 |
| 2005/0025015 | A1 * | 2/2005 | Horibata ...................... 369/53.3 |
| 2005/0030874 | A1 * | 2/2005 | Sasaki ............................ 369/94 |
| 2005/0063290 | A1 * | 3/2005 | Suzuki ........................ 369/275.1 |
| 2005/0207292 | A1 * | 9/2005 | Hung .......................... 369/47.5 |
| 2009/0040890 | A1 * | 2/2009 | Watanabe et al. .......... 369/47.15 |
| 2009/0116349 | A1 * | 5/2009 | Takashima .................. 369/47.1 |
| 2013/0343169 | A1 * | 12/2013 | Kuraoka, Tomotaka .. 369/44.26 |
| 2013/0343170 | A1 * | 12/2013 | Kuraoka, Tomotaka .. 369/47.37 |

FOREIGN PATENT DOCUMENTS

JP        2009-123331 A    6/2009

OTHER PUBLICATIONS

Osta.Org "Universal Disk Format Specification" Revision 2.50, Apr. 30, 2003, 165 pages.

* cited by examiner

*Primary Examiner* — Peter Vincent Agustin
(74) *Attorney, Agent, or Firm* — Sony Corporation

(57) ABSTRACT

A recording management apparatus includes: a control unit configured to perform track setting processing arranged to set, by recording purpose, a plurality of tracks serving as continuous recording areas to one layer of a recording medium having a plurality of layers serving as recording layers where recording of information is performed by laser irradiation, and closing track processing arranged to set each track to a continuous recording completed state within one layer alone.

13 Claims, 24 Drawing Sheets

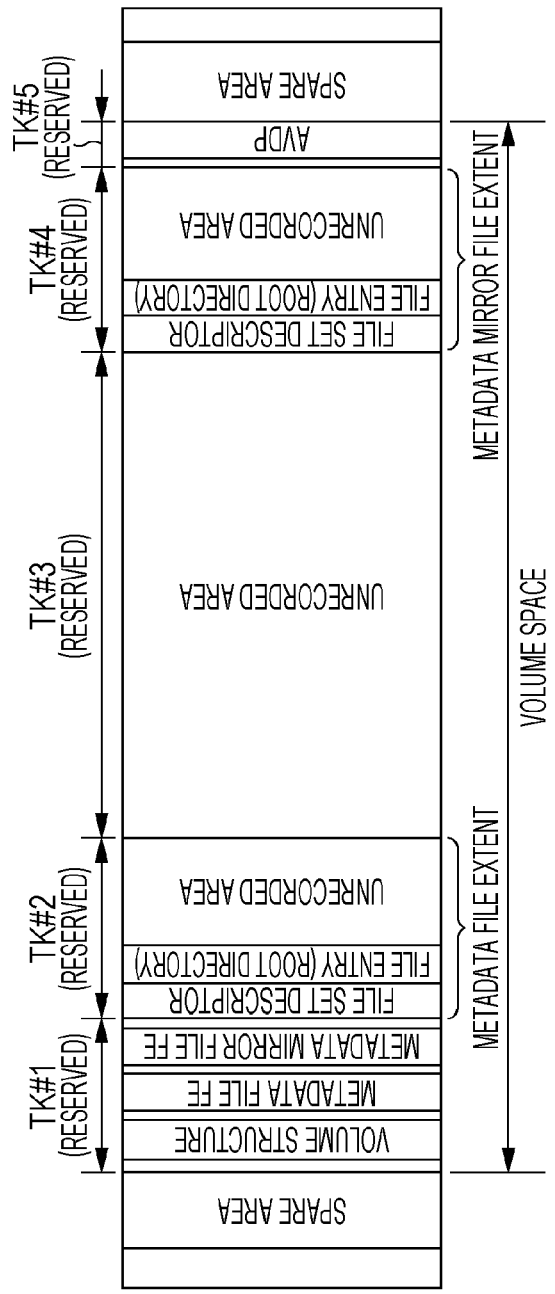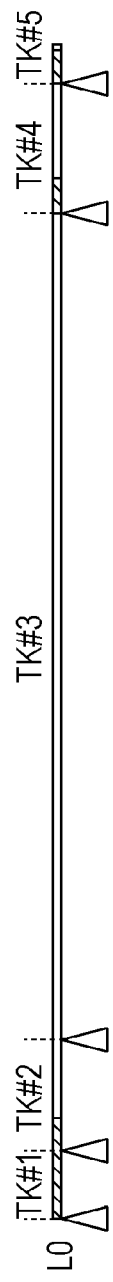
FIG. 7A
FIG. 7B

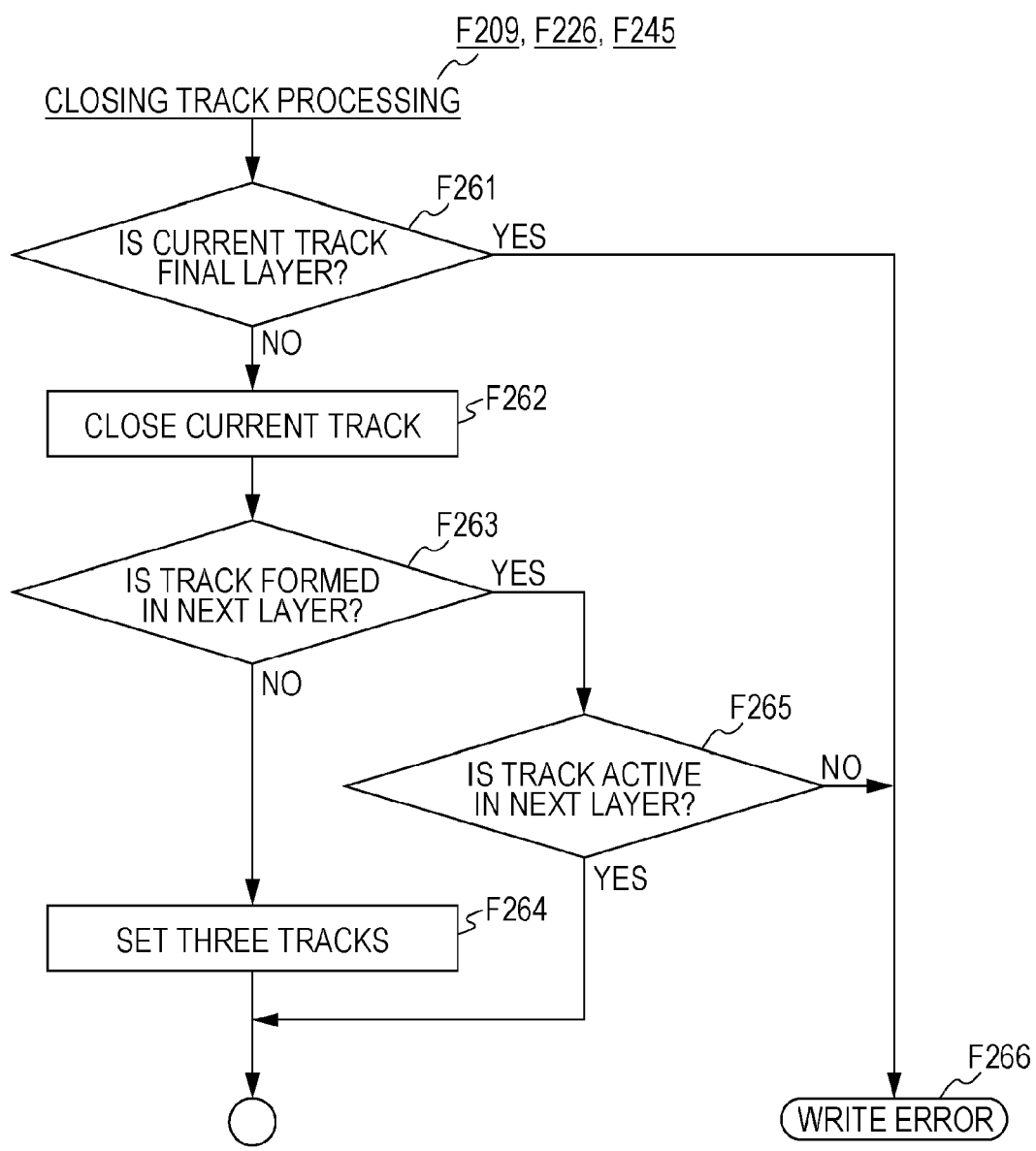

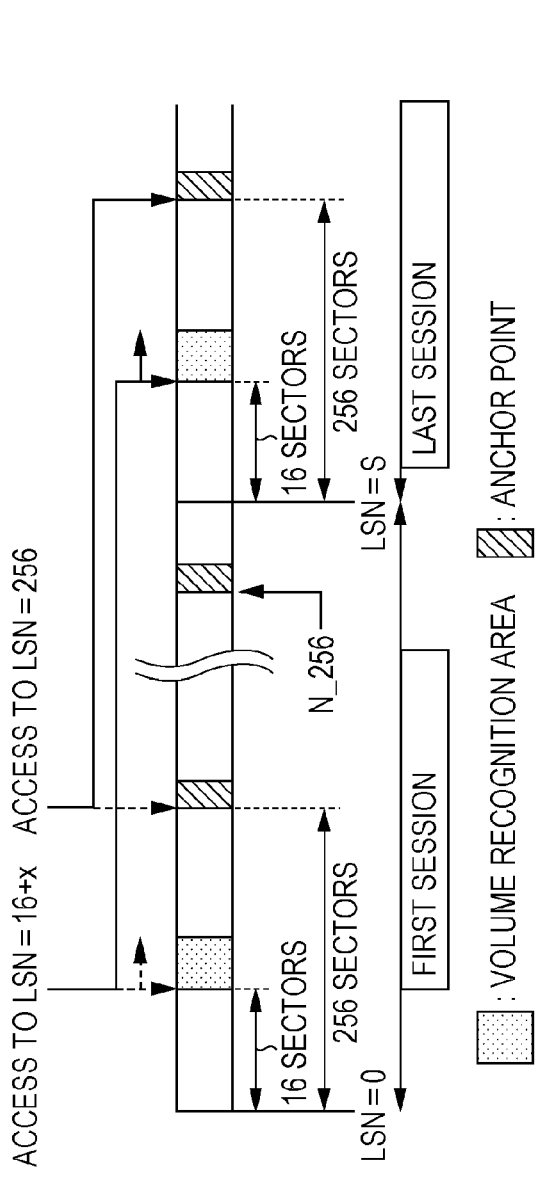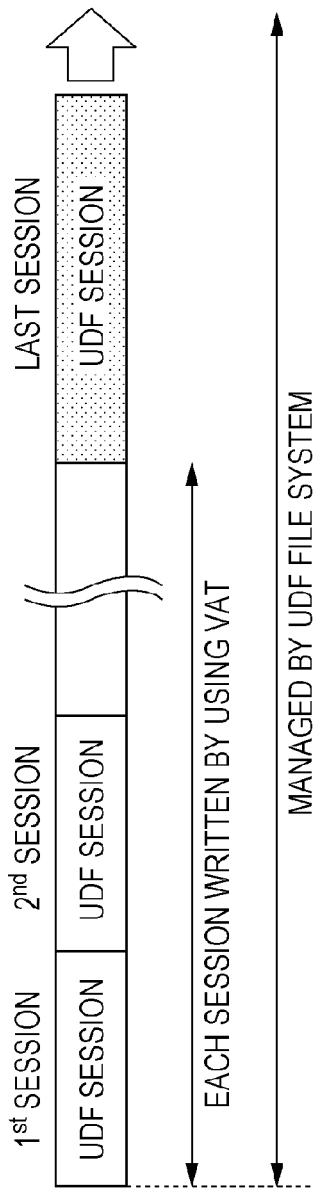
FIG. 19A
FIG. 19B

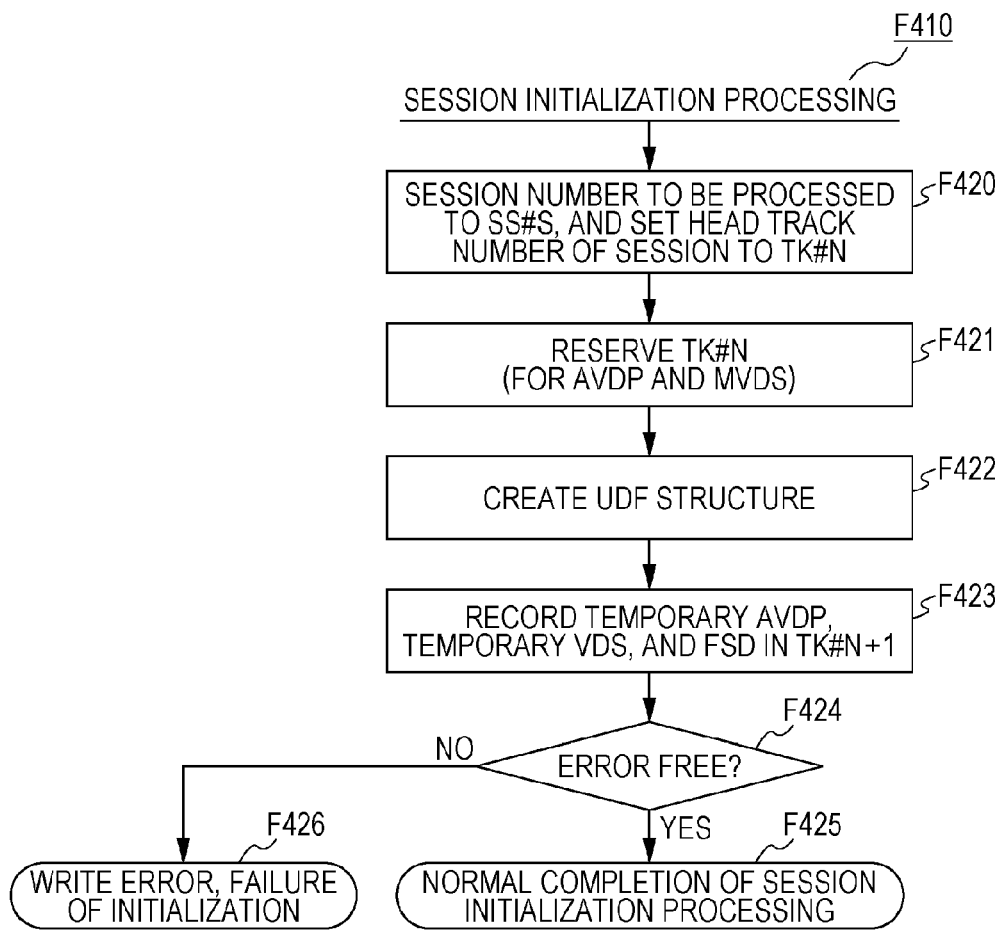

RECORDING MANAGEMENT APPARATUS, RECORDING MANAGEMENT METHOD, AND PROGRAM

BACKGROUND

The present disclosure relates to a recording management apparatus and a recording management method for a multilayer recording medium where multiple layers serving as recording layers are provided, and a program for realizing these.

Examples of the related art of the present disclosure include Japanese Unexamined Patent Application Publication No. 2009-123331.

So-called optical disc recording media (hereinafter, also simply referred to as optical disc), for example, such as CD (Compact Disc), DVD (Digital Versatile Disc), BD (Blu-ray Disc (registered trademark)) and so forth, for example, have widely spread come into widespread use as optical recording media where recording or playing of signals is performed by irradiation of light.

Heretofore, with regard to optical discs, large recording capacity has been achieved by realizing improvement in information recording density thereof. Specifically, there have been employed a technique for improving recording density in a direction where a formation pitch of tracks serving as pit rows or mark rows is narrowed, that is, in a radial direction, and a technique for improving recording density in a linear direction (direction orthogonal to a radial direction) by reduction in size of pits or marks. On the other hand, when realizing large recording capacity, a technique for increasing the number of recording layers (layers) is also effective, and multilayer discs such as 2-layer discs or 3 or more layer discs have been proposed and put into practical use under present circumstances.

SUMMARY

Incidentally, in the case of a multilayer disc, a layer disposed in the back as viewed from the laser entry face side is influenced by the recorded state of a layer on the front side. That is to say, at the time of recording in a certain layer, it is not desirable that a layer on the front side where a laser beam passes through has been recorded. In the event that a layer on the front side has been recorded, suitable recording as to an area of a layer to the back side that is overlapped by a recorded area of a layer to the front side may not be executed, depending on disc types. Also, with multilayer discs, there is also demand for effectively managing tracks (continuous recording areas) where user data and management information are recorded, and also improving reliability and operation performance. Further, there is also demand for performing recording operation effectively using areas.

Therefore, with the present disclosure, there will be proposed a track management technique for realizing reliability, operation performance, and effective use of a recording area.

A recording management apparatus according to the present disclosure includes: a control unit configured to perform track setting processing arranged to set, by recording purpose, a plurality of tracks serving as continuous recording areas to one layer of a recording medium having a plurality of layers serving as recording layers where recording of information is performed by laser irradiation, and closing track processing arranged to set each track to a continuous recording completed state within one layer alone.

A recording management method according to the present disclosure performs: track setting processing arranged to set, by recording purpose, a plurality of tracks serving as continuous recording areas to one layer of a recording medium having a plurality of layers serving as recording layers where recording of information is performed by laser irradiation; and closing track processing arranged to set each track to a continuous recording completed state within one layer alone.

A program according to the present disclosure is a program causing a central processing unit to execute the track setting processing and closing track processing.

With such a present disclosure, multiple tracks are set to one layer. For example, there are set a management information track of which the recording purpose is to record management information, a user data track of which the recording purpose is to record user data, a mirror track of which the recording purpose is to record mirror data of management information, and so forth. Each track is employed as a continuous recording area. For example, with a track for user data, recording of user data is physically consecutively (sequentially) executed.

These tracks are closed as a consecutive recording completed state within a layer alone. That is to say, one track is configured so as not to straddle layers.

Tracks are set by recording purpose within one layer, and also tracks do not straddle layers, thereby enabling progress management of recording operation in increments of layers. This, for example, enables operation such that from a layer on the rear side as viewed from the laser entry face side is used.

Also, various type of data (management information and user data) may be recorded in a physically separated manner using multiple tracks.

For example, user data, management information, and management information mirror may be dispersed. This leads to efficiency of recording operation, or improvement in reliability of each information.

According to the present disclosure, as recording operation with a multilayer recording medium as a target, improvement in reliability, improvement in operation performance, and effective use of each layer are realized.

BRIEF DESCRIPTION OF THE DRAWINGS

FIGS. 7A and 7B are explanatory diagrams of a file system (single layer) serving as a comparative example;

FIG. 16 is a flowchart of closing track processing according to the first embodiment;

FIGS. 19A and 19B are explanatory diagrams of a UDF multisession;

FIGS. 21A and 21B are flowcharts of session closing processing according to the second embodiment.

DETAILED DESCRIPTION OF EMBODIMENT

Hereinafter, an embodiment will be described in the following sequence.
1. Recording Medium
2. Location Control Technique Using Reference Plane
3. Host Apparatus and Recorder/Reproducer
4. First Embodiment
4-1. File System
4-2. Format (Initial Track Setting)
4-3. Recording/Closing Track/Track Setting of Next Layer
5. Second Embodiment
5-1. UDF Multisession
5-2. Format
5-3. Session Closing
6. Modifications

1. Recording Medium

First, description will be made regarding a recording medium which a recorder/reproducer which makes up a recording system in an embodiment of the present disclosure takes as an object of recording operation. Note that a multilayer recording medium (multilayer optical disc) which will be described below is just an example of a recording medium to be used for an embodiment. A configuration and mode of a recording layer or the like may also variably be conceived.

Figure 1:
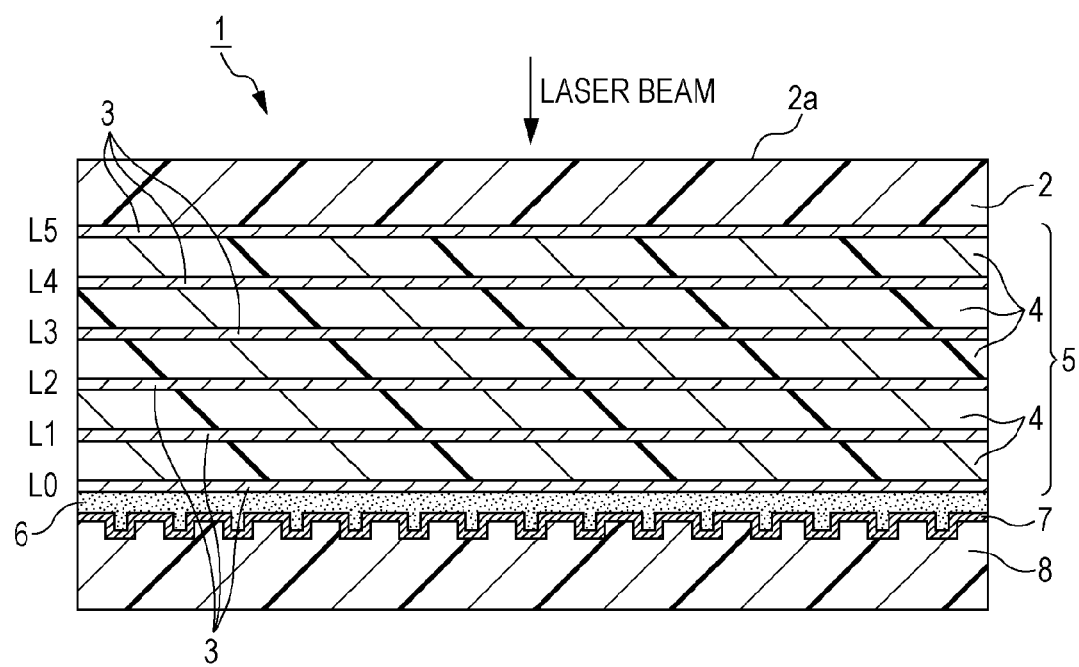
FIG. 1 is an explanatory diagram of a layer configuration of an optical disc to be used for an embodiment of the present disclosure.

FIG. 1 illustrates a cross-sectional configuration of a multilayer recording medium 1. This multilayer recording medium 1 is realized as an optical disc with the same diameter of 12 cm and the same thickness of 1.2 mm as with CD, DVD, and BD, for example. FIG. 1 schematically illustrates a cross-sectional configuration in the thick direction. As illustrated in FIG. 1, with the multilayer recording medium 1, there are formed a cover layer 2, a recording layer formation area 5 where multiple recording layers 3 are formed, an adhesion layer 6, a reflection film 7, and a substrate 8 in order from the upper layer side in FIG. 1. Here, a face where a laser beam from a later-described recorder/reproducer 10 side is input is the cover layer 2 side. A laser entry face 2a is the face of the cover layer 2. With the following description, the laser entry face 2a side will also be referred to as "front side", and the substrate 8 side will also be referred to as "rear side" with the laser entry direction as a reference.

With the multilayer recording medium 1, the cover layer 2 is configured of, for example, a resin, and serves as a protection layer of the recording layer formation area 5 formed on the rear side thereof.

The recording layer formation area 5 is configured so as to include multiple recording layers 3, and intermediate layers 4 inserted therebetween, as illustrated in FIG. 1. That is to say, the recording layer formation area 5 in this case is formed by layering repeatedly being performed such as recording layer 3→intermediate layer 4→recording layer 3→intermediate layer 4 . . . →recording layer 3. The recording layers 3 are configured of a semitransparent recording film. The intermediate layers 4 are configured of a resin material, for example, such as a heat-reversibility resin, ultraviolet curing resin, or the like.

In FIG. 1, though six recording layers 3 are formed within the recording layer formation area 5, this is consistently an example, and the number of recording layers may be set to other than "6". The recording layers 3 are referred to as layers L0, L1, L2, and so on in order from the rear side as viewed from the laser entry face 2a. This example has a 6-layer configuration, and accordingly, the layers L0 to L5 are formed as the recording layers 3.

With this example, with the recording layer formation area 5, no location guider (uneven pattern) in accordance with formation of a groove or pit row or the like is formed in each of the recording layers 3. That is to say, the recording layers 3 are formed in a planar shape. At the time of creation of such a recording layer formation area 5, a process for forming a location guider for each recording layer which is used for manufacturing of the current multilayer disc may be eliminated, and consequently, manufacturing cost and volume production of the multilayer recording medium 1 may effectively be reduced. The recording layers 3 have a planar shape, which means that address information and so forth according to the uneven patterns are not formed beforehand. At the time of recording of information, that is, at the time of recording of user data or management information which is principal information, the address information is recorded in accordance with recording of the principal information thereof. That is to say, the address information is embedded in the principal data (principal data for the purpose of recording such as user data or management information), and is encoded, and the encoded recorded data thereof is recorded.

A recording mark row is formed in the recording layers 3 in accordance with a recording operation. Note that the recording mark row mentioned here is a so-called "track" to be formed on an optical disc in a spiral shape. With the field of optical discs, in general, "track" is used for meaning an area unit to be continuously recorded (e.g., music unit in CD), and also used for meaning of a mark row, a pit row, a group, which are formed with a circumferential configuration, or the like. "Track" where track setting or close processing is performed with claims or a later-described embodiment of the present disclosure means increments of areas to continuously be recorded. In order to clarify description, the term "track" will not be used for a mark row or the like to be formed with a circumferential configuration, and in stead of this, "recording mark row" will be used.

Figure 2A:
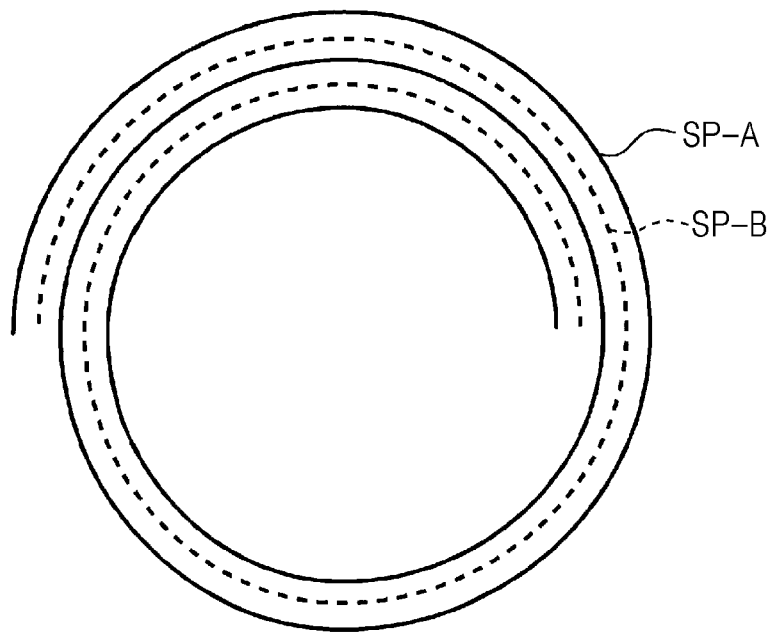
FIGS. 2A and 2B are explanatory diagrams of a track configuration of an optical disc to be used for an embodiment.
Figure 2B:
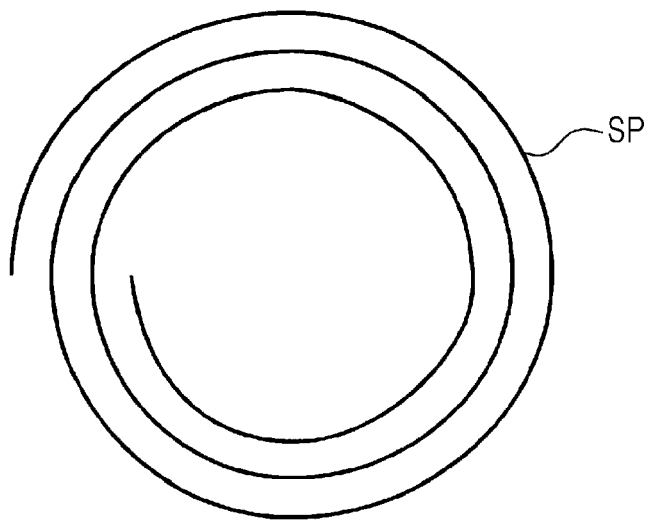

As examples of the recording mark row, an example formed in a double spiral shape as illustrated in FIG. 2A, and an example formed in a single spiral shape as illustrated in FIG. 2B may be conceived. The recording mark row in a single spiral shape is the same as with CD, DVD, or the like according to the related art. With the recording mark row in a double spiral shape, as illustrated with a solid line and a dashed line in FIG. 2A, tow spirals SP-A and SP-B are formed. The configuration of the recording mark row in a double spiral shape may be realized by a method for forming a spiral using two recording beams at the same time, or may be realized by a method for forming the first spiral SP-A with a certain pitch using one recording beam, and then forming the second spiral SP-B between the recording mark rows thereof. Note that an example of a double spiral is illustrated here, but there may be conceived a configuration of a recording mark row of which the spiral is further multiplexed such as a triple spiral, a fourfold spiral, or the like.

As illustrated in FIG. 1, a reflection film 7 is formed further to the rear side from the recording layer formation area 5 via an adhesion layer (intermediate layer) 6 configured of a predetermined adhesive material. With this reflection film 7, a location guider for guiding a recording/playing position is formed. Note that a location guider is formed in the reflection film, which means that the reflection film is formed on an interface where a location guider is formed.

Specifically, in this case, a location guider is formed on one face side of the substrate 8 in FIG. 1, and accordingly, an uneven cross-sectional shape is given as illustrated in FIG. 1, and the reflection film 7 is formed on the face where this uneven cross-sectional shape of the substrate 8 is given, whereby a location guider is formed on this reflection film 7. Note that the substrate 8 is configured of a resin such as polycarbonate or the like. This substrate 8 may be generated by injection molding using stamper for providing an uneven cross-sectional shape serving as the location guider, for example.

Here, as performed by the present recordable optical disc, address information that represents an absolute position in a direction parallel to the inner direction of the recording face of the multilayer recording medium 1 may be recorded by formation of the location guider. For example, in the event that the location guider is formed of a groove, this absolute position information may be recorded by modulation of the meandering (wobbling) cycle of this groove, and in the event that the location guider is formed of a pit row, the absolute position information may be recorded by modulation of pit length or formation interval.

Note that no location guider is formed for the recording layers 3 as described above, and control of a recording position on the recording layers 3 is performed based on reflected light from the reflection film 7 where the location guider is formed as will be described below. In this meaning, hereinafter, the reflection film 7 (reflection surface) where the location guider is formed will be referred to as "reference plane Ref". Also, address information recorded in the reference plane Ref in an uneven pattern will be referred to as "reference plane address" in meaning for being distinguished from an address to be recorded in a recording layer 3. Also, an address to be recorded in a recording layer 3 along with principal information will be referred to as "recording layer address".

No location guider is formed in the recording layers 3, and accordingly, there may be manufactured a multilayer recording medium which does not lead to increase in cost as described above. However, in this case, in order to suitably access a recording layer 3 where no address exists, the reference plane Ref is provided in a state layered on the recording layer 3. With the reference plane Ref, addresses are formed in an uneven pattern such as a wobbling groove or pit row or the like beforehand. Thus, access to a desired position on the multilayer recording medium 1 may be performed depending on an address of the reference plane Ref, and recording or reproducing of information (user data and management data) may be performed on a recording layer 3 in the position thereof.

Note that the description so far has been made regarding an example of the multilayer recording medium 1 with a recording layer 3 formed in a planar shape, and the following description will be made regarding an example using such a multilayer recording medium 1, but there may also be a configuration of the multilayer recording medium 1 wherein addresses are formed on a recording layer 3 of the multilayer recording medium 1 by uneven patterns such as wobbling grooves or pit rows or the like. Track management operation serving as a later-described embodiment of the present disclosure may also be applied to a multilayer recording medium in a mode wherein uneven patterns such as wobbling grooves and pit rows are formed on a recording layer 3.

2. Location Control Technique Using Reference Plane

Figure 3A:
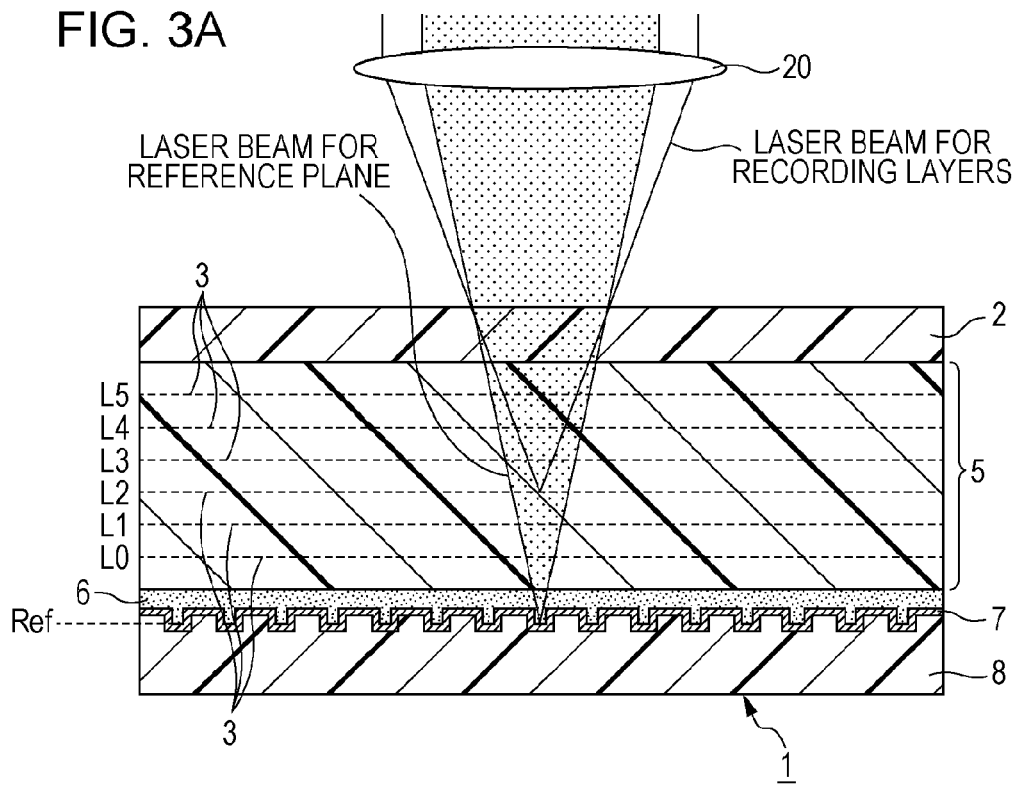
FIGS. 3A and 3B are explanatory diagrams of servo operation to an optical disc to be used for an embodiment.
Figure 3B:
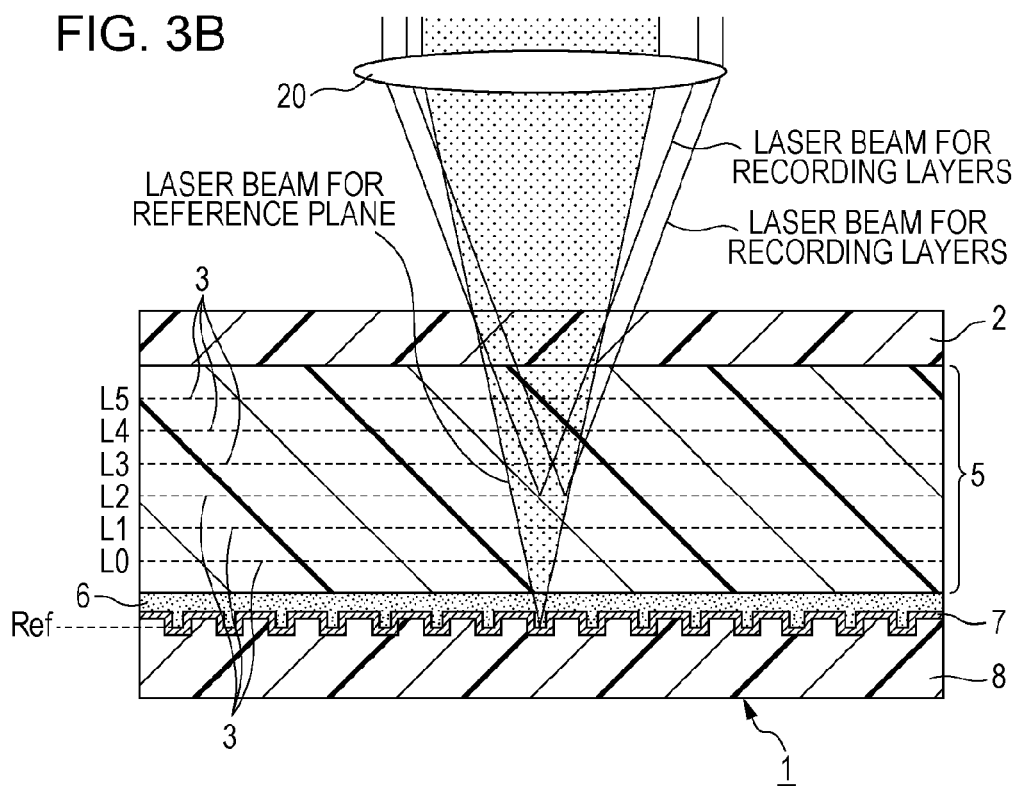

FIGS. 3A and 3B are explanatory diagrams regarding a location control technique with the location guider formed on the reference plane Ref being used. In order to realize location control regarding a laser beam for recording layers to be irradiated on a recording layer 3, a laser beam for performing location control based on the location guider on the reference plane Ref (hereinafter, referred to as laser beam for reference plane) is irradiated on the multilayer recording medium 1 according to the above-mentioned configuration, along with the laser beam for recording layers. Specifically, these laser beam for recording layers and laser beam for reference plane are irradiated on the multilayer recording medium 1 via a common objective lens 20 as illustrated in FIG. 3A. At this time, in order to realize accurate tracking servo, the optical axes of the laser beam for recording layers and laser beam for reference plane are configured so as to agree.

At the time of recording of a mark on a recording layer 3 (desired semitransparent recording film), the laser beam for reference plane is irradiated so as to be focused on the reflection surface (reference plane Ref) of the reflection film 7 as illustrated in FIG. 3A, and location control of the objective lens 20 is performed in accordance with a tracking error signal to be obtained based on the reflected beam thereof. That is to say, tracking servo is applied thereto. Thus, a location in a tracking direction of the laser beam for recording layers to be irradiated via the same objective lens 20 may be controlled to a desired location.

On the other hand, location control at the time of reproducing may be realized as follows. At the time of reproducing, a mark row (i.e., recorded track) is formed on a recording layer 3, and accordingly, tracking servo may be applied to this mark row with the laser beam for recording layers itself. That is to say, tracking servo at the time of reproducing may be realized by performing location control of the objective lens 20 in accordance with a tracking error signal to be obtained based on a reflected beam of the laser beam for recording layers.

Here, with the location control technique as described above, in the event that a beam having the same wavelength band as with the laser beam for recording layers is employed as the laser beam for reference plane, there is no other choice than that a reflection ratio regarding the laser beam for recording layers has to be increased regarding the reference plane Ref where the reflected beam of the laser beam for reference plane has to be obtained. That is to say, there is concern that stray light components increase accordingly, which markedly worsens reproducing performance. Therefore, let us assume that a beam of which the wavelength band differs from the laser beam for reference plane and laser beam for recording layers is used, and a reflection film having wavelength selectivity is used as the reflection film 7 where the reference plane Ref is formed. Specifically, in the case of the present example, the wavelength of the laser beam for recording layers is taken as the same approximate 405 nm as with a case of BD, and the wavelength of the laser beam for reference plane is taken as the same approximate 650 nm as with the case of DVD. As the reflection film 7, there is employed a wavelength selectivity reflection film which selectively reflects a beam having the same wavelength band as with the laser beam for reference plane, and transmits or absorbs a beam according to wavelength other than that. According to such a configuration, unnecessary reflected light components of the laser beam for recording layers may be prevented from being generated from the reference plane Ref, and a suitable S/N (signal-to-noise ratio) may be secured.

FIG. 3B is an example wherein two laser beams are irradiated as the laser beams for recording layers. Cases where two laser beams for recording layers are irradiated include a case where recording mark rows having a double spiral shape are recorded or reproduced at the same time, a case where regardless of a double spiral and a single spiral, adjacent track servo (ATS) is employed wherein recording of an adjacent recording mark row is performed along a recording mark row already recorded in a recording layer 3, and so forth.

Briefly speaking, with the ATS, one of the two laser beams for recording layers is taken as a spot for recording, and the other is taken as a spot for servo. Next, while the spot for servo is irradiated on a recording mark row already recorded (e.g., at the time of one round ahead) to perform tracking servo, a recording mark row adjacent to the recording mark row irradiated by this spot for servo is recorded using the spot for recording. In the event of the ATS, tracking servo with the reference plane Ref may not necessarily be performed during recording. However, tracking and address reading with the reference plane Ref is necessary for seek to a recording start location. Also, though detailed description will be avoided, in reality, during execution of the ATS, servo control frequently is inaccurate due to accumulation of error components. Therefore, correction of servo operation may also be performed with information of the reference plane Ref during execution of the ATS. Accordingly, the reference plane Ref is also employed for tracking control even at the time of recording in the event of employing the ATS method.

3. Host Apparatus and Recorder/Reproducer

Figure 4:
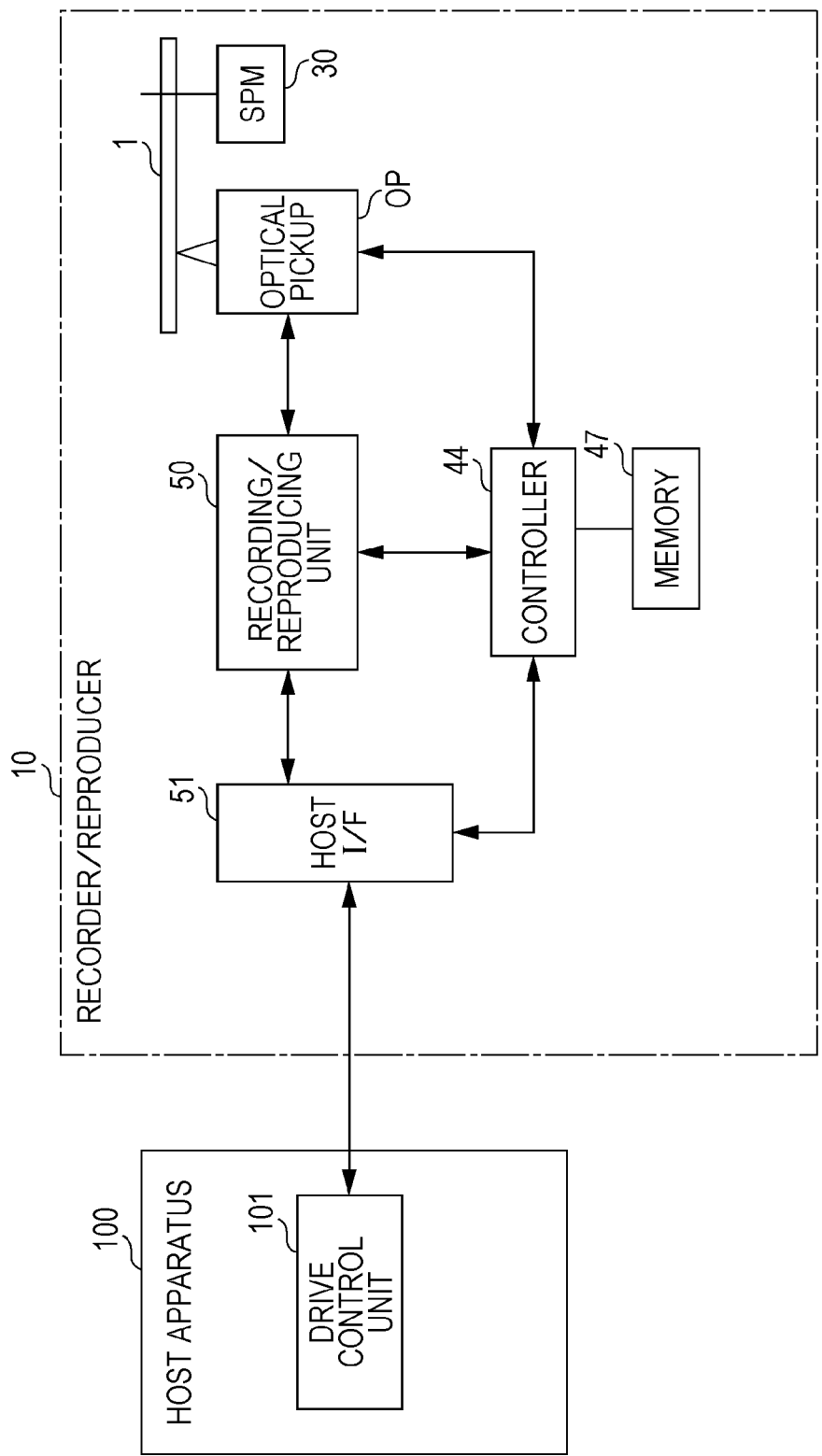
FIG. 4 is a schematic block diagram of a host apparatus and a recorder/reproducer, according to an embodiment.

Next, description will be made regarding the configurations of the host apparatus 100 and recorder/reproducer 10 which make up a recording system according to an embodiment, with reference to FIGS. 4 through 6. The recorder/reproducer 10 has a reproducing function along with a recording function for an optical disc serving as the multilayer recording medium 1. FIG. 4 illustrates a schematic configuration of the host apparatus 100 and recorder/reproducer 10.

The host apparatus 100 issue various commands to the recorder/reproducer 10, and causes the recorder/reproducer 10 to execute recording/reproducing to the multilayer recording medium 1 by the recorder/reproducer 10. The host apparatus 100 and recorder/reproducer 10 have a relation, for example, such as a host computer device and a disk drive device, and may be separate devices, or may be an integral device. For example, the host apparatus 100 serving as a computer device causes the recorder/reproducer 10 to execute recording or reproducing according to a request from application software or OS (Operating System). Here, a portion which controls the recorder/reproducer 10 is illustrated as a drive control unit 101. The drive control unit 101 performs, for example, file system management conforming to a UDF (Universal Disk Format) as a file system to be constructed in the multilayer recording medium 1, executes track setting and closing track processing for this purpose, and instructs the recorder/reproducer 10 to reflect a management state on the multilayer recording medium 1.

This FIG. 4 illustrates, as the configuration of the recorder/reproducer 10, a controller 44, an optical pickup OP, a spindle motor 30, a recording/reproducing processing unit 50, a host interface 51, and memory 47. The host interface 51 of the recorder/reproducer 10 performs communication with the host apparatus 100. For example, the host interface 51 receives various commands and recorded data from the host apparatus, and also transmits data reproduced from the multilayer recording medium 1 to the host apparatus 100. The controller 44 controls the units so that recording, reproducing, format processing, or the like is executed for the multilayer recording medium 1 according to various commands to be supplied from the host apparatus 100 via the host interface 51.

Laser irradiation by the optical pickup OP is performed on the multilayer recording medium 1 while the multilayer recording medium 1 is rotated by the spindle motor 30, and recording or reproducing of information is performed. The recording/reproducing unit 50 performs signal processing or servo operation for recording or reproducing. The memory 47 is used for storing a work area and various parameters that the controller 44 uses. Hereinafter, description will be made in detail regarding a configuration example of the optical pickup OP and recorder/reproducer 10 with reference to FIGS. 5 and 6.

Figure 5:
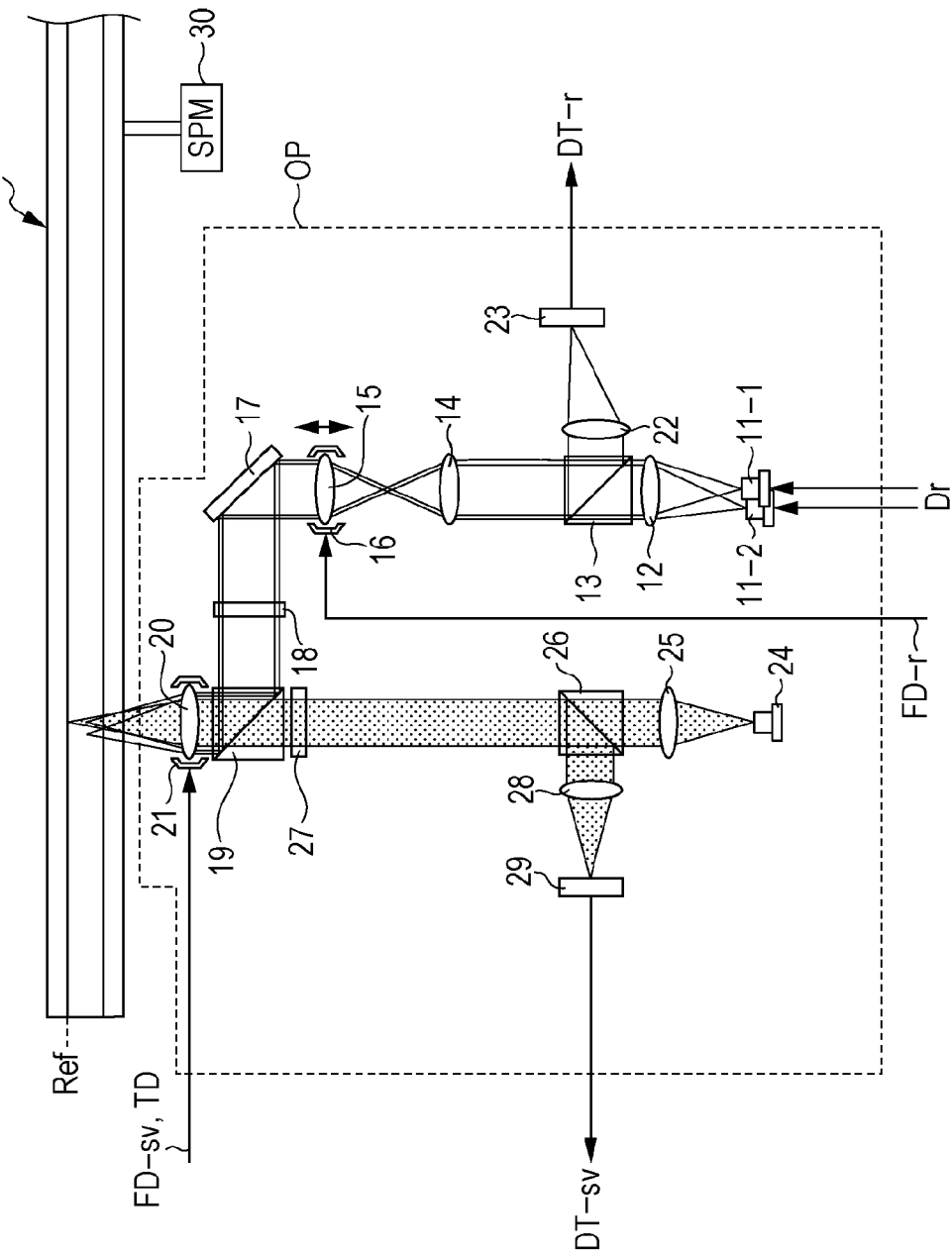
FIG. 5 is an explanatory diagram of a configuration of an optical system of a recorder/reproducer according to an embodiment.

FIG. 5 illustrates an internal configuration of the optical pickup OP included in the recorder/reproducer 10. Note that, as illustrated in FIG. 3B, a configuration example will be described here wherein two laser beams are output as the laser beams for recording layers, and also, the laser beam for reference plane is output. In the case of the method described in FIG. 3A, it has to be understood that the two systems of the laser beams for recording layers which will be described below are one system.

First, the multilayer recording medium 1 loaded in the recorder/reproducer 10 is set so that a center hole thereof is clamped in a predetermined location at this recorder/reproducer 10, and is in a state in which rotational driving by the spindle motor 30 illustrated in FIG. 4 is enabled. With the recorder/reproducer 10, the optical pickup OP is provided as a configuration for irradiating a laser beam for recording/reproducing on the multilayer recording medium 1 to be rotated and driven by the spindle motor 30.

Within the optical pickup OP, lasers 11-1 and 11-2 for recording layers which are light sources of the laser beams for recording layers. Also, there is provided a laser 24 for reference plane which is a light source of the laser beam for reference plane that is light for performing location control with the location guider formed on the reference plane Ref and reading of a reference plane address.

Also, with the optical pickup OP, there is provided an objective lens 20 serving as an output end to the multilayer recording medium 1 of the laser beams for recording layers and laser beam for reference plane. Further, there are provided a light-receiving unit 23 for recording layers for receiving a reflected beam from the multilayer recording medium 1 of the laser beams for recording layers, and a light-receiving unit 29 for reference plane for receiving a reflected beam from the multilayer recording medium 1 of the laser beam for reference plane.

With the optical pickup OP, there is formed an optical system for guiding the laser beam for recording layers to the objective lens 20 and also guiding a reflected beam from the multilayer recording medium 1 input to this objective lens 20 to the light-receiving unit 23 for recording layers. Note that, with the laser beams for recording layers of the two systems, for example, at the time of recording, one is used as a laser beam for recording, and the other is used as a laser beam for the ATS servo. Also, at the time of reproducing, an arrangement may be made wherein both laser beams are taken as laser beams for reproducing, and reproducing is performed on the spirals of a recording mark row having a double spiral shape at the same time. However, the use of the two laser beams for recording layers is not restricted to such use. For example, an arrangement may be made wherein the two laser beams for recording layers are both used for recording at the time of recording, and recording mark rows having a double spiral shape are formed at the same time. Further, description will be made with a configuration example wherein the recorder/reproducer 10 includes the one optical pickup OP, but it may also be assumed that the recorder/reproducer 10 includes multiple optical pickups OP. In this case, roles (utilizing method) of the laser beams for recording layers of the one or two systems in the optical pickups OP may variously be conceived.

The optical system for the laser beams for recording layers will specifically be described in accordance with the example in FIG. 5. The laser beams for recording layers of the two systems emitted from the laser 11-1 and 11-2 for recording layers are converted so as to become parallel beams via a collimate lens 12, and then input to a polarization beam splitter 13. The polarization beam splitter 13 is configured so as to transmit the laser beams for recording layers thus input from the light sources.

The laser beam for recording layers transmitted from the polarization beam splitter 13 is input to a focus mechanism configured so as to include a fixed lens 14, a moving lens 15 and a lens driving unit 16. This focus mechanism is provided for adjusting of a focusing position regarding the laser beam for recording layers, and is configured so that a side closer to the lasers 11-1 and 11-2 for recording layers is taken as the fixed lens 14, and the moving lens 15 is disposed on a far side, and the moving lens 15 side is driven in a direction parallel to the laser optical axis by the lens driving unit 16.

The laser beam for recording layers passes through the fixed lens 14 and moving lens 15 which make up the focus mechanism is reflected at the mirror 17, and then is input to a dichroic prism 19 via a quarter-wave plate 18. The dichroic prism 19 is configured so that a selective reflection surface thereof reflects a beam having the same wavelength band as with the laser beam for recording layers, and transmits a beam having a wavelength other than that. Accordingly, the laser beam for recording layers thus input is reflected at the dichroic prism 19.

The laser beam for recording layers reflected at the dichroic prism 19 is irradiated (focused) on the multilayer recording medium 1 (target recording layer 3) via the objective lens 20 as illustrated in FIG. 5. There is provided to the objective lens 20 a biaxial actuator 21 which holds this objective lens 20 in a focus direction (direction attaching or detaching for the multilayer recording medium 1), and in a tracking direction (direction orthogonal to the focus direction, i.e., disc radial direction) so as to be displaced. A focus coil and a tracking coil are provided to the biaxial actuator 21, and driving signals (later-described drive signals FD-sv and TD) are given thereto respectively, and accordingly, the objective lens 20 is displaced in each of the focus direction and tracking direction.

Here, in response to the laser beam for recording layers being irradiated on the multilayer recording medium 1 as described above, a reflected beam of the laser beam for recording layers is obtained from this multilayer recording medium 1 (recording layer 3 to be reproduced). This reflected beam of the laser beam for recording layers is guided to the dichroic prism 19 via the objective lens 20, and reflected at this dichroic prism 19. The reflected beam of the laser beam for recording layers reflected at the dichroic prism 19 is input to the polarization beam splitter 13 via the quarter-wave plate 18→mirror 17→focus mechanism (moving lens 15→fixed lens 14).

The reflected beam of the laser beam for recording layers thus input to the polarization beam splitter 13 passes through the quarter-wave plate 18 twice at an outward trip and a return trip, and consequently, the polarization direction thereof is rotated 90 degrees as compared to the outward trip beam thereof. As a result thereof, the reflected beam of the laser beam for recording layers thus input is reflected at the polarization beam splitter 13.

The reflected beam of the laser beam for recording layers reflected at the polarization beam splitter 13 is condensed on a light-receiving face of the light-receiving unit 23 for recording layers via a condensing lens 22. A received light signal obtained by the light-receiving unit 23 for recording layers receiving the reflected beam of the laser beam for recording layers will hereinafter be referred to as a received light signal DT-r.

Also, within the optical pickup OP, there is formed an optical system for guiding the laser beam for reference plane emitted from the laser 24 for reference plane to the objective lens 20 and also guiding the reflected beam of the laser beam for reference plane from the multilayer recording medium 1 input to this objective lens 20 to the light receiving unit 29 for reference plane. As illustrated in FIG. 5, the laser beam for reference plane emitted from the laser 24 for reference plane is converted so as to become a parallel beam via the collimate lens 25, and then input to the polarization beam splitter 26. The polarization beam splitter 26 is configured so as to transmit the laser beam (outward trip beam) for reference plane thus input from the laser 24 for reference plane side.

The laser beam for reference plane transmitted the polarization beam splitter 26 is input to the dichroic prism 19 via a quarter-wave plate 27. As described above, the dichroic prism 19 is configured so as to reflect a beam having the same wavelength band as with the laser beam for recording layers and so as to transmit a beam having a wavelength other than that, and accordingly, the laser beam for reference plane transmits the dichroic prism 19 and is irradiated on the multilayer recording medium 1 (reference plane Ref) via the objective lens 20.

Also, the reflected beam of the laser beam for reference plane (reflected beam from the reference plane Ref) to be obtained in response to the laser beam for reference plane thus irradiated on the multilayer recording medium 1 transmits the dichroic prism 19 via the objective lens 20, and is input to the polarization beam splitter 26 via the quarter-wave plate 27. The reflected beam of the laser beam for reference plane thus input from the multilayer recording medium 1 side passes through the quarter-wave plate 27 twice at an outward trip and a return trip, and consequently, the polarization direction thereof is rotated 90 degrees as compared to the outward trip beam thereof, and accordingly, the reflected beam of the laser beam for reference plane is reflected at the polarization beam splitter 26.

The reflected beam of the laser beam for reference plane reflected at the polarization beam splitter 26 is condensed on a light-receiving face of the light-receiving unit 29 for reference plane via a condensing lens 28. A received light signal obtained by the light-receiving unit 29 for reference plane receiving the reflected beam of the laser beam for reference plane will hereinafter be referred to as a received light signal DT-sv.

Here, as illustrated in the previous FIG. 1, with the multilayer recording medium 1, the reference plane Ref is provided further to the rear side from the recording layer formation area 5, and accordingly, at the time of recording, focus servo control of the objective lens 20 is performed so that the laser beam for reference plane is focused on the reference plane Ref thus provided to the rear side of the recording layer formation area 5. Moreover, with regard to the laser beam for recording layers, the collimation state of the laser beam for recording layers input to the objective lens 20 is adjusted by the previous focus mechanism (lens driving unit 16) being driven by focus servo control based on the reflected beam of the laser beam for recording layers so that the laser beam for recording layers is focused on a recording layer 3 formed further to the front side from the reference plane Ref.

Also, tracking servo control of the laser beam for recording layers at the time of reproducing is performed so as to have a spot of this laser beam for recording layers follow a mark row formed on the recording layer 3 to be reproduced. That is to say, tracking servo control of the laser beam for recording layers at the time of reproducing may be realized by controlling the location of the objective lens 20 based on the reflected beam of this laser beam for recording layers. Note that focus servo control at the time of reproducing may be the same as at the time of recording.

Figure 6:
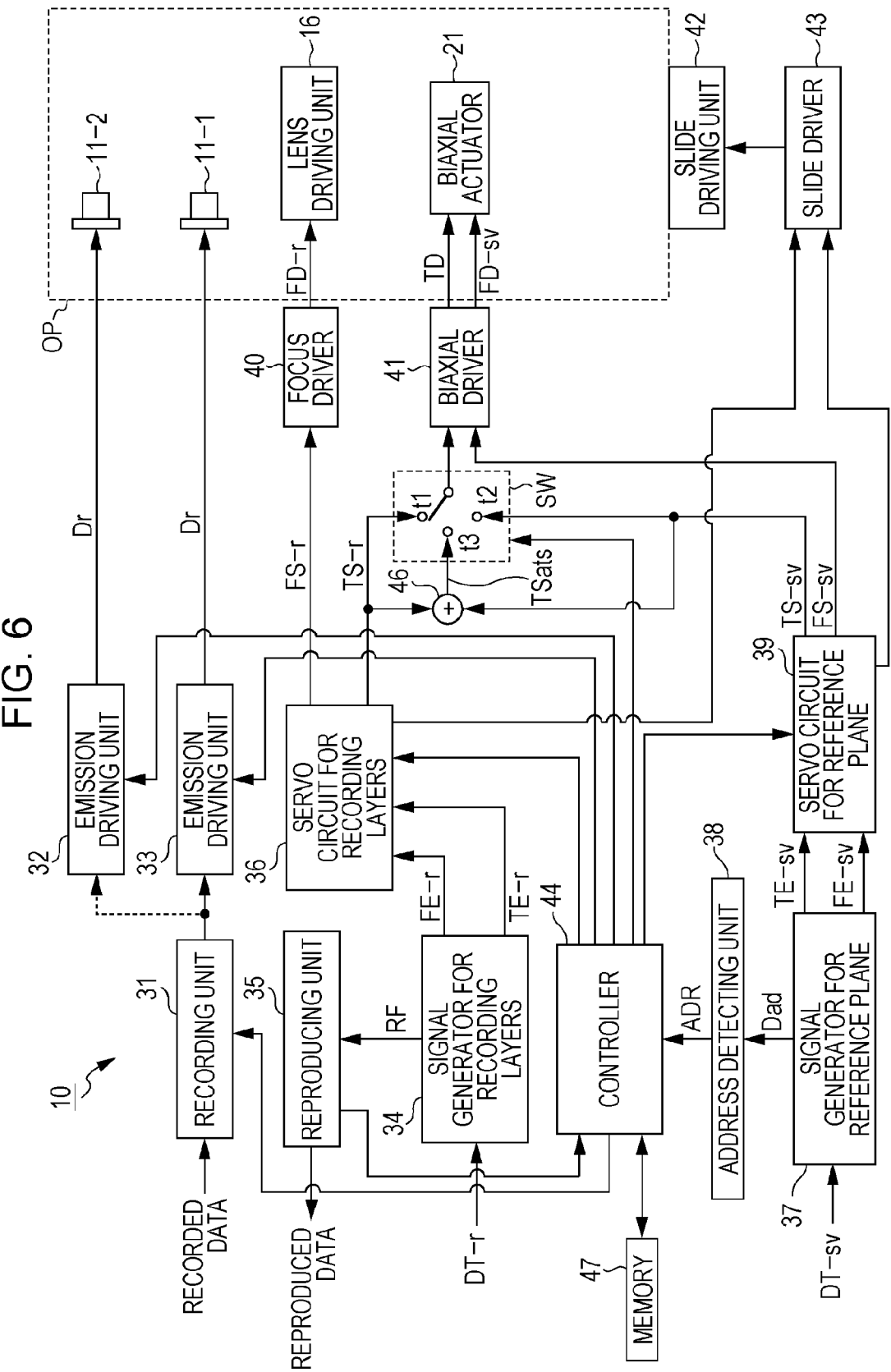
FIG. 6 is a block diagram of principal portions of a recorder/reproducer according to an embodiment.

FIG. 6 illustrates the detailed internal configuration of the recorder/reproducer 10 according to an embodiment. Note that, in FIG. 5, with regard to the internal configuration of the optical pickup OP, of the configuration illustrated in FIG. 4, only the lasers 11-1 and 11-2 for recording layers, lens driving unit 16, and biaxial actuator 21 are extracted and illustrated. Also, in this drawing, drawing of the spindle motor 30 and host interface 51 illustrated in FIGS. 4 and 5 is omitted. In FIG. 6, the units except for the controller 44, memory 47, optical pickup OP, and slide driving unit 42 may be conceived as the internal configuration of the recording/reproducing unit 50 in FIG. 4.

In FIG. 6, with the exterior of the optical pickup OP in the recorder/reproducer 10, there are provided a recording unit 31, an emission driving unit 32, an emission driving unit 33, a signal generator 34 for recording layers, a reproducing unit 35, a recording layer servo circuit 36, a focus driver 40, and a biaxial driver 41 as a configuration for performing recording/reproducing with a recording layer 3 in the multilayer recording medium 1 as a target, or location control of focus/tracking based on the reflected beam from the recording layer 3.

The recording unit 31 generates recording modulation code according to recorded data to be input. Specifically, the recording unit 31 obtains a recorded modulation code row which is, for example, a binary data row of "0" and "1" to be actually recorded with a recording layer 3 as a target by adding an error correction code to the recorded data to be input, or subjecting the recorded data to be input to predetermined recorded modulation coding, or the like. At this time, the recording unit 31 also performs addition processing of address information (recording layer address) for the recorded data according to an instruction from a later-described controller 44. The recording unit 31 gives a recorded signal based on the generated recorded modulation code row to one or both of emission driving units 33 and 32.

For example, in the event of executing the ATS (adjacent track servo) for forming a single-spiral-shaped or double-spiral-shaped track, at the time of recording, recording is performed regarding one of the laser beams for recording layers of the two systems, and tracking to an adjacent track is performed regarding the other using reproducing power. Therefore, the recorded signal generated by the recording unit 31 is given to only the one emission driving unit 33, the emission driving unit 33 generates a laser driving signal Dr based on the recorded signal to be input from the recording unit 31 at the time of recording, and emission-drives the laser 11-1 for recording layers based on the driving signal Dr. Thus, a mark row according to the recorded data may be recorded in a recording layer 3. At this time, the other emission driving unit 32 emission-drives the laser 11-2 for recording layers using reproducing power.

Also, while performing tracking control using the reference plane Ref, double spiral recording may also be performed regarding both of the laser beams for recording layers of the two systems at the same time. In such a case, the recorded signal generated by the recording unit 31 is given to the emission driving units 32 and 33 in a distributed manner. The emission driving units 32 and 33 generate a laser driving signal Dr based on the recorded signal, and the lasers 11-1 and 11-2 for recording layers are emission-driven based on the laser driving signal Dr. Thus, a mark row according to the recorded data may be recorded in a recording layer 3.

The signal generator 34 for recording layers generates an RF signal (reproduced signal), a focus error signal FE-r, and a tracking error signal TE-r based on the received light signal DT-r (output current) from the multiple light-receiving elements serving as the light-receiving units 23 for recording layers illustrated in FIG. 4. The focus error signal FE-r is a signal which represents focus error of the laser beams for recording layers as to the recording layer 3 serving as a recording/reproducing target. Also, the tracking error signal TE-r is a signal which represents location error in a radial direction of a spot position of the laser beam for recording layers as to a track formed in the recording layer 3. The RF signal obtained at the signal generator 34 for recording layers is supplied to the reproducing unit 35, and also, the focus error signal FE-r and tracking error signal TE-r are supplied to the servo circuit 36 for recording layers, respectively.

The reproducing unit 35 obtains reproduced data which is the previous recorded data restored by subjecting the RF signal to binarization processing, and predetermined demodulation processing such as decoding of recorded modulation code or error correction processing or the like. Also, the reproducing unit 35 also performs reproducing processing of a recording layer address inserted into recorded data. The recording layer address reproduced at the reproducing unit 35 is supplied to the controller 44.

The servo circuit 36 for recording layers performs servo calculation processing on the focus error signal FE-r, tracking error signal TE-r to generate a focus servo signal FS-r and a tracking servo signal TS-r. The tracking servo signal TS-r is supplied to a later-described switch SW.

Also, the focus servo signal FS-r is supplied to the focus driver 40. The focus driver 40 generates a focus drive signal FD-r based on the focus servo signal FS-r, and drives the lens driving unit 16 based on this focus drive signal FD-r. Thus, focus servo control regarding the laser beams for recording layers, that is, focus servo control for having the laser beam for recording layers focus on a recording layer 3 serving as a recording target is realized.

Also, the servo circuit 36 for recording layers also performs control regarding slide moving of the optical pickup OP by the slide driving unit 42. The slide driving unit 42 holds the entire optical pickup OP so as to be slide-driven in a tracking direction. The servo circuit 36 for recording layers extracts low-frequency components of the tracking error signal TE-r to generate a slide error signal, and generates a slide servo signal based on the slide error signal. This slide servo signal is given to the slide driver 43 to drive the slide driving unit 42, thereby realizing slide servo control of the optical pickup OP. Also, the servo circuit 36 for recording layers gives a control signal according to an instruction from the controller 44 to the slide driver 43, thereby realizing predetermined slide moving of the optical pickup OP by the slide driving unit 42. Also, the servo circuit 36 for recording layers also performs execution control of track jump operation for turning off the tracking servo, and jumping the spot of the laser beam for recording layers to another track, in response to the instruction from the controller 44.

A signal generator 37 for reference plane, an address detecting unit 38, and a servo circuit 39 for reference plane are provided to the recorder/reproducer 10 as a signal processing system regarding the reflected beam of the laser beam for reference plane.

The signal generator 37 for reference plane generates a necessary signal based on the received light signal DT-sv from the multiple light-receiving elements in the light-receiving unit 29 for reference plane illustrated in FIG. 5. Specifically, the signal generator 37 for reference plane generates a tracking error signal TE-sv which represents location error in the radial direction of the spot location of the laser beam for reference plane as to the location guider (pit row) formed in the reference plane Ref based on the received light signal DT-sv. Also, the signal generator 37 for reference plane generates a focus error signal FE-sv which represents focus error of the laser beam for reference plane as to the reference plane Ref (reflection film 7). Also, the signal generator 37 for reference plane generates an address detection signal Dad as a signal for detecting address information recorded in the reference plane Ref. In the event that a pit row is formed in the reference plane Ref, a summation signal has to be generated as this address detection signal Dad.

The address detection signal Dad generated by the signal generator 37 for reference plane is supplied to the address detecting unit 38. The address detecting unit 38 detects a reference plane address ADR recorded in the reference plane Ref based on the address detection signal Dad. The detected reference plane address ADR is supplied to the controller 44.

Also, the focus error signal FE-sv and tracking error signal TE-sv generated by the signal generator 37 for reference plane are supplied to the servo circuit 39 for reference plane.

The servo circuit 39 for reference plane performs servo calculation processing on the focus error signal FE-sv and tracking error signal TE-sv to generate a focus servo signal FS-sv and a tracking servo signal TS-sv.

The focus servo signal FS-sv is supplied to the biaxial driver 41. The biaxial driver 41 generates a focus drive signal FD-sv based on the focus servo signal FS-sv, and drives a focus coil of the biaxial actuator 21 based on this focus drive signal FD-sv. Thus, focus servo control regarding the laser beam for reference plane, that is, focus servo control for having the laser beam for reference plane focus on the reference plane Ref is realized.

Also, the servo circuit 39 for reference plane also performs control regarding slide moving of the optical pickup OP by the slide driving unit 42. Specifically, the servo circuit 39 for reference plane extracts low-frequency components of the tracking error signal TE-sv to generate a slide error signal, and generates a slide servo signal based on this slide error signal. This slide servo signal is given to the slide driver 43 to drive the slide driving unit 42, thereby realizing slide servo control of the optical pickup OP. Also, the servo circuit 39 for reference plane gives the slide driver 43 a control signal according to an instruction from the controller 44, thereby realizing desired slide moving of the optical pickup OP by the slide driving unit 42.

Also, the servo circuit 39 for reference plane also performs execution control of track jump operation for turning off the tracking servo, and jumping the spot of the laser beam for reference plane to another track, in response to the instruction from the controller 44.

The tracking servo signal TS-sv generated by the servo circuit 39 for reference plane is supplied to a t2 terminal of the switch SW.

Note that the tracking servo signals TS-r and TS-sv are supplied to a calculator 46, and a tracking servo signal TS-ats for the ATS servo is generated by predetermined calculation processing. The tracking servo signal TS-ats is supplied to a t3 terminal of the switch SW.

Here, the switch SW is provided for switching, regarding the tracking servo control of the object lens 20, tracking servo control for having the laser beam for reference plane follow the location guider on the reference plane Ref, tracking servo control for having the laser beam for recording layers follow a track on the recording layer 3, and the ATS control at the time of recording. For example, at the time of reproducing, there may be performed tracking servo control for having the laser beam for recording layers follow a track on the recording layer 3. At the time of recording, the ATS control is performed wherein recording is performed while tracking to an adjacent track. At the time of access (seek) for reproducing or recording, there is performed tracking servo control for having the laser beam for reference plane follow the location guider on the reference plane Ref.

The switch SW selectively outputs one of the tracking servo signals TS-r, TS-sv, and TS-ats in response to an instruction from the controller 44. The tracking servo signal TS selectively output by the switch SW is supplied to the biaxial driver 41, and the biaxial driver 41 drives the tracking coil of the biaxial actuator 21 using the tracking drive signal TD generated by the supplied tracking servo signal TS. Thus, the objective lens 20 is driven so as to have the spot of the laser beam for reference plane follow a track on the reference plane Ref, or driven so as to have the spot of the laser beam for recording layers follow a track on a recording layer 3.

The controller 44 is configured of a microcomputer including, for example, a CPU (Central Processing Unit), and memory (storage apparatus) such as ROM (Read Only Memory), RAM (Random Access Memory), and so forth, and performs the entire control of the recorder/reproducer 10 by executing control or processing in accordance with a program stored in the ROM or the like for example. For example, the controller 44 performs instructions for the servo circuit 36 for recording layers and servo circuit 39 for reference plane based on the recording layer address obtained at the reproducing unit 35, and the reference plane address ADR obtained at the address detecting unit 38 to perform seek operation control for moving the spot locations of the laser beam for reference plane and laser beam for recording layers to a predetermined address. Also, the controller 44 performs instructions for the servo circuit 36 for recording layers, servo circuit 39 for reference plane, and switch SW, thereby executing focus servo control or tracking servo control with a technique according to each case such as recording, reproducing, or seek using the reference plane Ref as to the multilayer recording medium 1.

The controller 44 performs, in response to a recording command or reproducing command from the host apparatus 100, the reproducing operation, recording operation, access (seek) operation, and servo execution control for these. Also, the controller 44 also performs recording operation for physical or logical format according to a format command from the host apparatus 100 as will be described later, or recording operation control serving as closing track processing according to recording progress. Also, the controller 44 performs, other than instructions from the host apparatus, for example, such as readout or updating of the management information in the multilayer recording medium 1, reproducing operation, recording operation, access (seek) operation, and servo execution control for these as appropriate.

The memory 47 is illustrated as a work area and a RAM area where the controller 44 stores various types of information. For example, the memory 47 is used for storing communication data with the host apparatus, storing laser power serving as an OPC result regarding each layer, and storing management information read out from the multilayer recording medium 1, management information to be updated according to recording operation, and so forth.

4. First Embodiment

4-1. File System

A track management system serving as a first embodiment will be described. Note that the track management according to an embodiment is performed as file system management that the drive control unit 101 of the host apparatus 100 performs. With this file system management, track setting processing and closing track processing are performed.

Specifically, with the first embodiment, the drive control unit 101 is configured to perform track setting processing for setting multiple tracks serving as continuous recording area (SRR: Sequential recording range) to one layer of the multiple layer recording medium 1 according to a recording purpose, and closing track processing for setting each track to a continuous recording completion state within one layer alone. Note that this processing is reflected on the multilayer recording medium 1 by the drive control unit 101 instructing the controller 44 of the recorder/reproducer 10.

Now, first, as a comparative example as to the embodiment, FIGS. 7A and 7B illustrate a logical layout and a physical layout of a file system (conforming to UDF (Universal Disk Format)) to be used for one-layer disc (single layer disc).

FIG. 7A illustrates, as a logical layout of the file system, an example wherein five tracks TK#1 to TK#5 have been set in volume space. Note that a spare area is set outside the volume space. The track TK mentioned here is an increment wherein information is consecutively recorded in a physical area on an optical disc, and is referred to as the above-mentioned SRR, for example. With this example, the track TK#1 is address space where there is recorded management information such as a volume structure (Volume Structure), a metadata file FE (Metadata File File Entry), a metadata mirror file FE (Metadata Mirror File File Entry), and so forth. The track TK#2 is a continuous recording area of a metadata file, and is address space where a file set descriptor, and a file entry serving as the root directory are recorded. The track TK#3 is address space where user data is consecutively recorded, for example. The track TK#4 is a continuous recording area of a metadata mirror file (copy of metadata), and is address space where a file set descriptor (FSD: File Set Descriptor) and a file entry (File Entry) are recorded. The track TK#5 is address space where an AVDP (Anchor Volume Descriptor Pointer) is recorded. Note that details regarding the above-mentioned each data (volume structure, metadata file FE, metadata mirror file FE, file set descriptor, AVDP, etc.) have been described in "Universal Disk Format Specification Revision 2.50" OSTA, 2003, or the like.

As illustrated in FIG. 7B, these tracks TK#1 to TK#5 are physically disposed in a layer L0 of the 1-layer disc. With regard to the tracks TK#1 to TK#5, according to data recording of each, an NWA (Next Writable Address: Next recording address) is updated to the next address of a recorded address, and at the time of recording, recording is performed from an address indicated with the NWA. Thus, with the tracks TK#1 to TK#5, recording advances by physical areas within a track being sequentially used. In FIG. 7B, a shaded portion indicates an area where recording has been performed (note that a recorded area is similarly illustrated as a shaded portion in later-described FIGS. 8B, 9B, 10A to 11B, 18A, 22A, 22B).

Figure 8A:
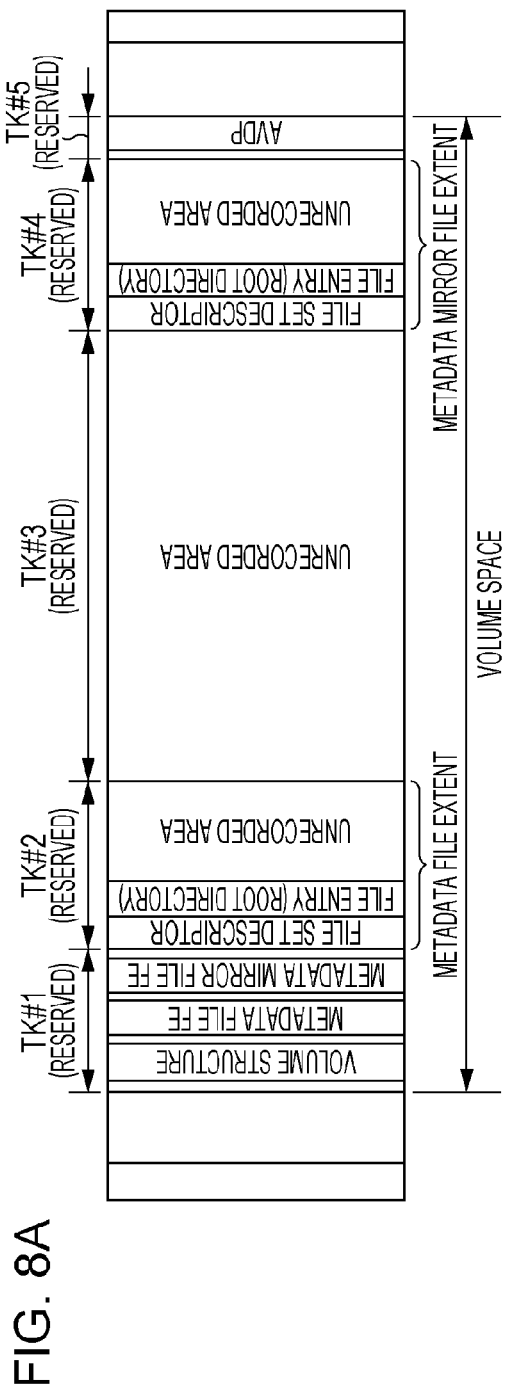
FIGS. 8A and 8B are explanatory diagrams of a file system (multilayer) serving as a comparative example.
Figure 8B:
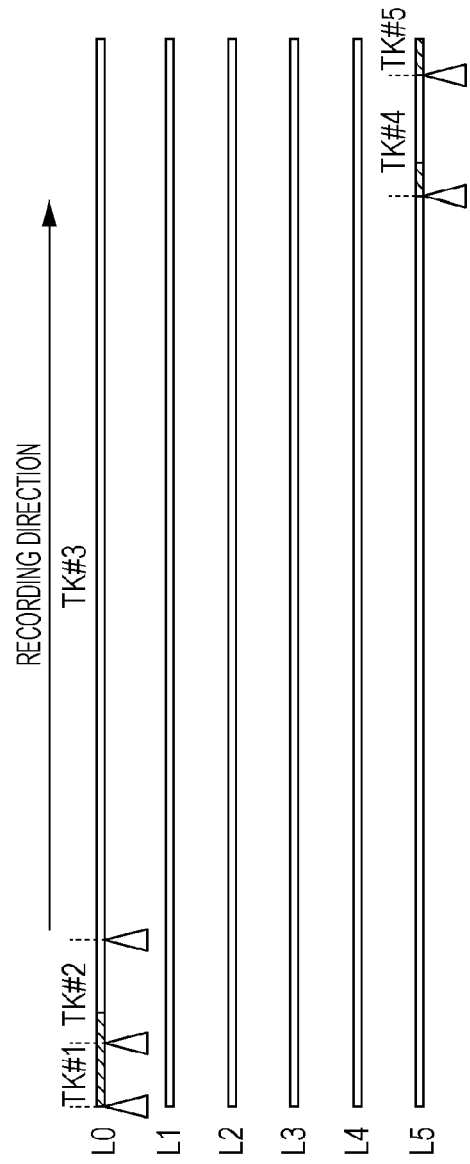

In the event of a 1-layer disc, there is the layer L0 alone as a physical recording area, and consequently, as illustrated in FIG. 7B, the tracks TK are formed in the layer L0. Now, FIGS. 8A and 8B illustrate an example of a multilayer disc serving as a comparative example. The logical layout in FIG. 8A is the same as with the schematic diagram 7A. FIG. 8B illustrates a physical layout example in the event of a 6-layer disc. Track recording of the logical layout in FIG. 8A is realized using areas of layers L0 to L5. The layers L0 to L5 are taken as one physical recording space, and the tracks TK#1 to TK#5 are set. With this example, the tracks TK#1 and TK#2 are set within the layer L0, and the track TK#3 is set over a range of the layers L0 to L5. The tracks TK#4 and TK#5 are set in the rear edge area of the layer L5. That is to say, this example in FIGS. 8A and 8B is an example where the file system conforming to the 1-layer disc has been applied to a multilayer disc by simply expanding the entire of each recording layer without change.

However, in the event of applying the file system as illustrated in FIGS. 8A and 8B to the multilayer recording medium 1 such as a multilayer disc or the like, this includes the following problem. For example, with regard to writing of metadata and writing of metadata mirror, operation efficiency deteriorates. This is because a layer has to greatly be moved. Also, a layer on the rear side is influenced by a recording situation of a layer on the front side as viewed from the laser entry face side, and tends to execute unsuitable recording. For example, let us say that recording of user data at the track TK#3 has advanced, and has reached the layer L1. With regard to the tracks TK#1 and TK#2, the recorded layer L1 exists on the laser entry face side, which may disturb recording to the tracks TK#1 and TK#2 in the future, for example, updating of the management information in accordance with recording of user data, or the like.

That is to say, a file system according to the related art and a physical track management method have many disadvantageous points for the multilayer recording medium 1. Therefore, with the present embodiment, track management will be performed as follows, which will be described with reference to FIGS. 9A to 11B.

Figure 9A:
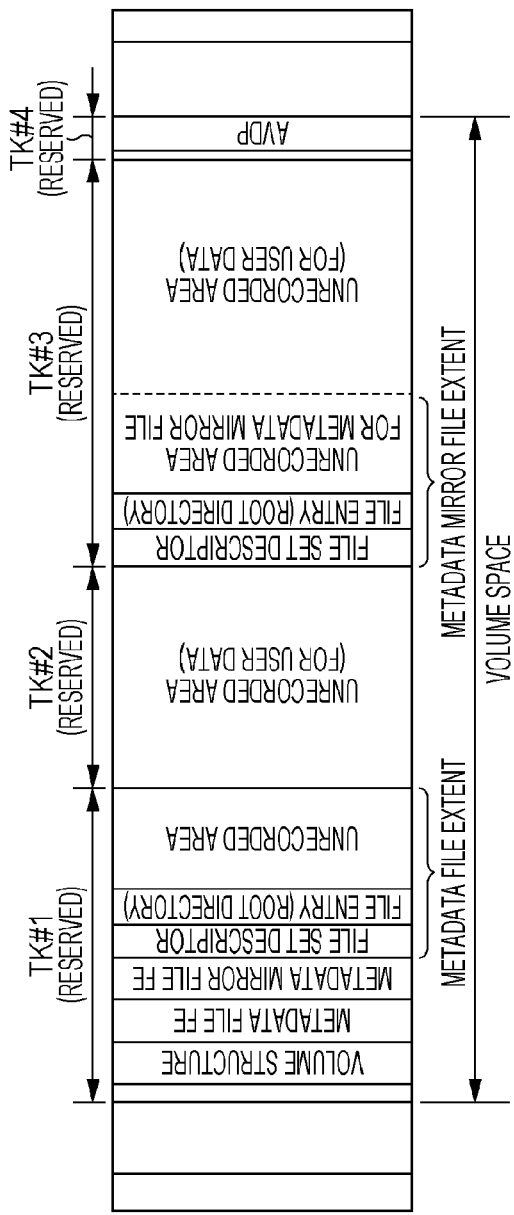
FIGS. 9A and 9B are explanatory diagrams of a file system according to an embodiment.

FIG. 9A is a logical layout example of a file system according to an embodiment. With an initial state, four tracks TK#1 to TK#4 are set in the volume space as an example. With this example, the track TK#1 is address space where a volume structure, a metadata file FE, a metadata mirror file FE, a file set descriptor, and a file entry serving as the root directory are recorded. That is to say, the track TK#1 is taken as a management information track where a management information file is taken as a recording purpose. The track TK#2 is address space where user data is consecutively recorded, for example. That is to say, the track TK#2 is a user data track of which purpose is to record user data. The track TK#3 is a continuous recording area of a metadata mirror file (copy of metadata), and is address space where a file set descriptor and a file entry are recorded. That is to say, the track TK#3 is a mirror track where a mirror file of management information is taken as a recording purpose. The track TK#4 is address space where an AVDP (Anchor Volume Descriptor Pointer) is recorded.

Figure 9B:
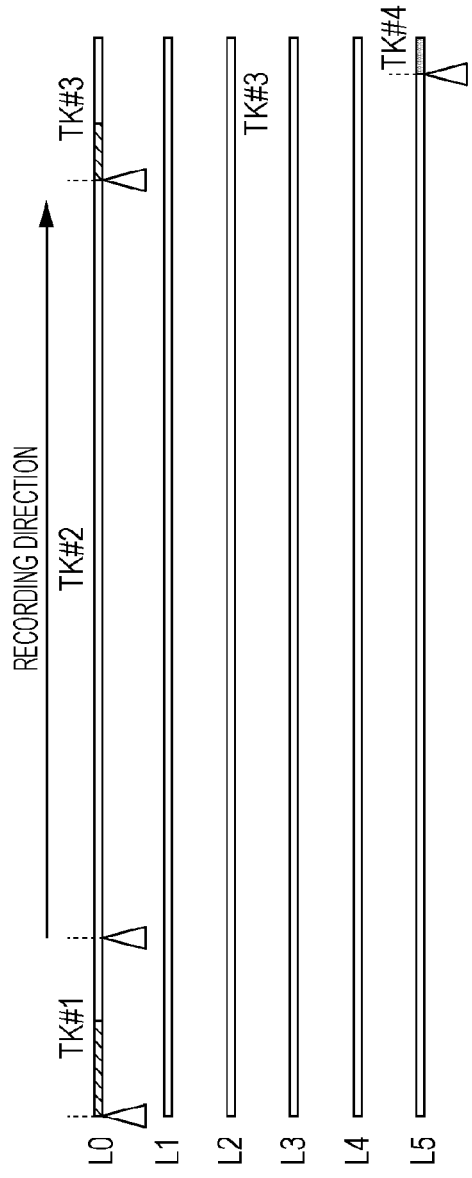

Such tracks TK#1 to TK#4 are set on the multilayer recording medium 1 as with FIG. 9B in an initial state using format processing. That is to say, with the layer L0 which is the rear-most side as viewed from the laser entry face side, the tracks TK#1, TK#2, and TK#3 are set. The track TK#4 is set to the rear edge portion of the layer L5 which is the front-most side as viewed from the laser entry face side. Now, let us say that, with the layers L0 to L5, recording has advanced with a parallel track path. With this drawing, for example, with all of the layers L0 to L5, recording has advanced from the left towards the right (e.g., from the outer circumference to the inner circumference of a disc).

The initial state is, as viewed regarding the layer L0, a state in which the tracks TK#1 (management information track), TK#2 (user data track), and TK#3 (mirror track) for each recording purpose are set. Note that the layers L2 to L5 are in an unused state other than the AVDP (track TK#4), and not track setting has been performed. Therefore, up to an area immediately before the track TK#4 of the layers L1 to L5 is in a state transiently managed as the track TK#3.

Figure 10A:
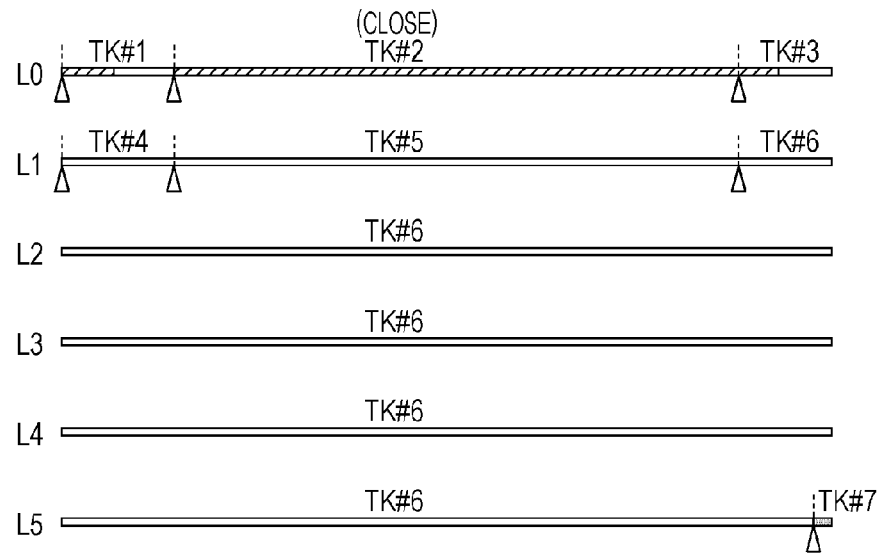
FIGS. 10A and 10B are explanatory diagrams of a scene of track division according to a first embodiment.

Thereafter, according to progress of recording, track setting is performed in order on the layers at the front-most side. For example, let us say that recording of user data regarding the track TK#2 of the layer L0 has advanced, and the track TK#2 has been completely used. In this case, as illustrated in FIG. 10A, the track TK#2 is closed. The "close" mentioned here is a state in which recording of a track thereof has been completed, and is a management state in which this track will not be used for sequential recording serving as a continuous recording area. Data rewriting of a closed track may be handled by POW (Pseudo Over Write) using sparing processing. In the event that a sparing area has been prepared on the multilayer recording medium 1, logical rewriting (POW) has to be performed using the sparing area thereof, and even if a sparing area has not particularly been prepared, POW may be performed using another track area as a sparing area, for example.

The track TK#2 is closed, and also as with the layer L0, the tracks TK#4 (management information track), TK#5 (user data track), and TK#6 (mirror track) for each recording purpose is set to the layer L1 next to the front side. In this state, recording of user data is sequentially executed using the track TK#5.

With regard to the layer L0 at this point-in-time, the tracks TK#1, TK#2, and TK#3 are in a state completed only within the layer L0. Note that, with the state in FIG. 10A, the tracks TK#1 and TK#3 have not been closed. In this case, recording of a management information file or mirror file may be performed using the tracks TK#1 and TK#3. Closer to the laser entry face side than the tracks TK#1 and TK#3, the tracks TK#4 and TK#6 are set to the layer L1 so as to be overlapped, but this is because the tracks TK#4 and TK#6 have not been recorded yet, and the tracks TK#4 and TK#6 do not have an adverse affect on recording of the tracks TK#1 and TK#3. The tracks TK#1 and TK#3 are closed in the event of each of the areas has completely been used, or at the time of the NWA becomes invalid for any reason, or the like. Thus, all of the tracks TK#1, TK#2, and TK#3 are in a state managed as a track of which the consecutive recording has been completed within the layer L0 alone.

Also, in FIG. 10A, at the time of the track TK#2 being closed, the tracks TK#4 to TK#6 have newly been set in the layer L1 by dividing the track TK#3, but this has a meaning that the track TK#5 to be used for recording of user data is prepared. In the event that the track TK#1 has previously completely been used prior to the track TK#2, the track TK#1 is closed, and the tracks TK#4 to TK#6 are newly set to the layer L1. That is to say, the track TK#4 to be used for recording of the management information is prepared.

Figure 10B:
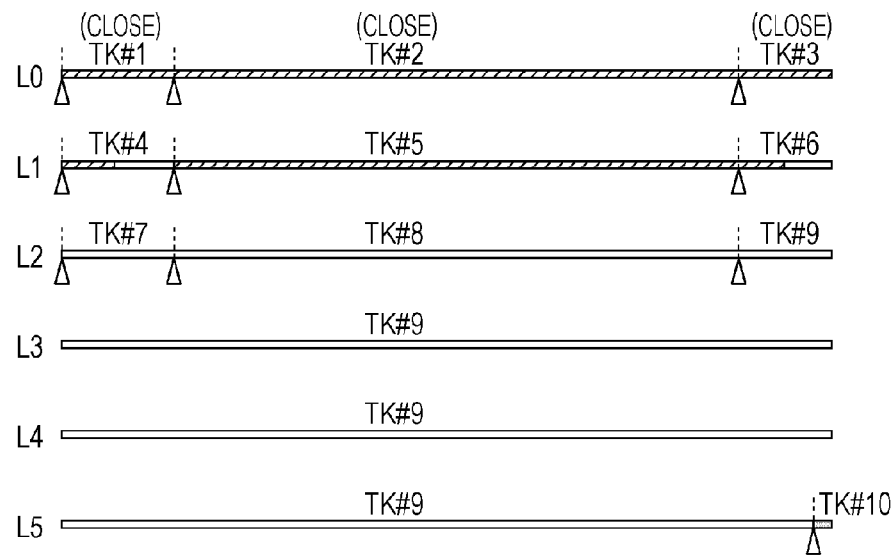

FIG. 10B illustrates a case where recording of user data regarding the track TK#5 of the layer L1 has advanced from the state in FIG. 10A, and the track TK#5 has completely been used. In this case, in the same way as described above, the track TK#5 is closed. Next, the tracks TK#7 (management information track), TK#8 (user data track), and TK#9 (mirror track) for each recording purpose is set to the layer L2 next toward the front side. In this state, recording of subsequent user data is sequentially executed using the track TK#8.

Figure 11A:
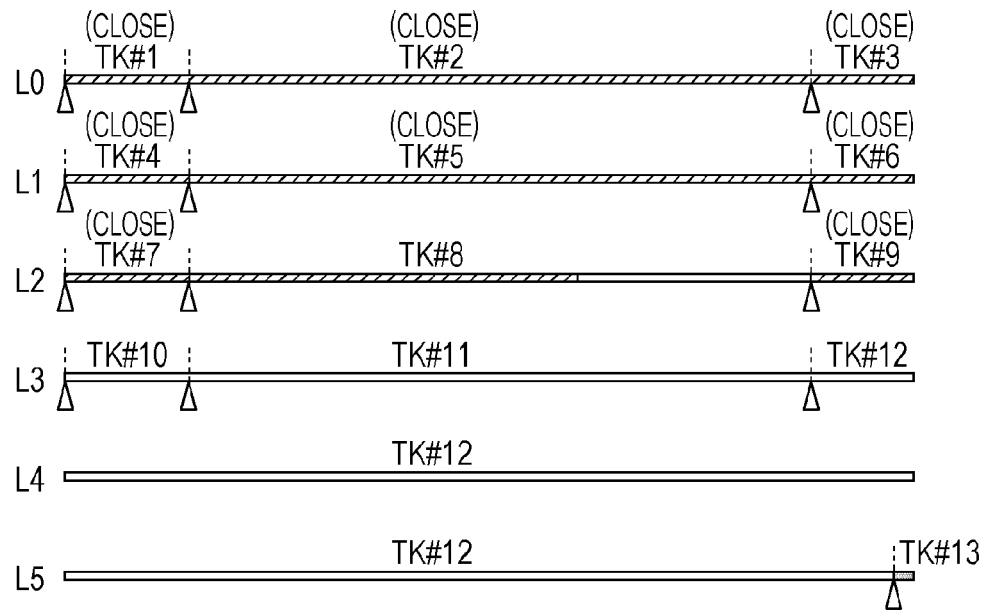
FIGS. 11A and 11B are explanatory diagrams of a scene of track division according to the first embodiment.

FIG. 11A illustrates a case where the tracks TK#7 and TK#9 of the layer L2 have completely been used from the state in FIG. 10B. In this case, the tracks TK#7 and TK#9 are closed. Next, the tracks TK#10 (management information track), TK#11 (user data track), and TK#12 (mirror track) for each recording purpose is set to the layer L3 next toward the front side. In this state, recording of the management information file thereafter is sequentially executed using the track TK#10, and recording of the mirror file thereafter is sequentially executed using the track TK#12.

Figure 11B:
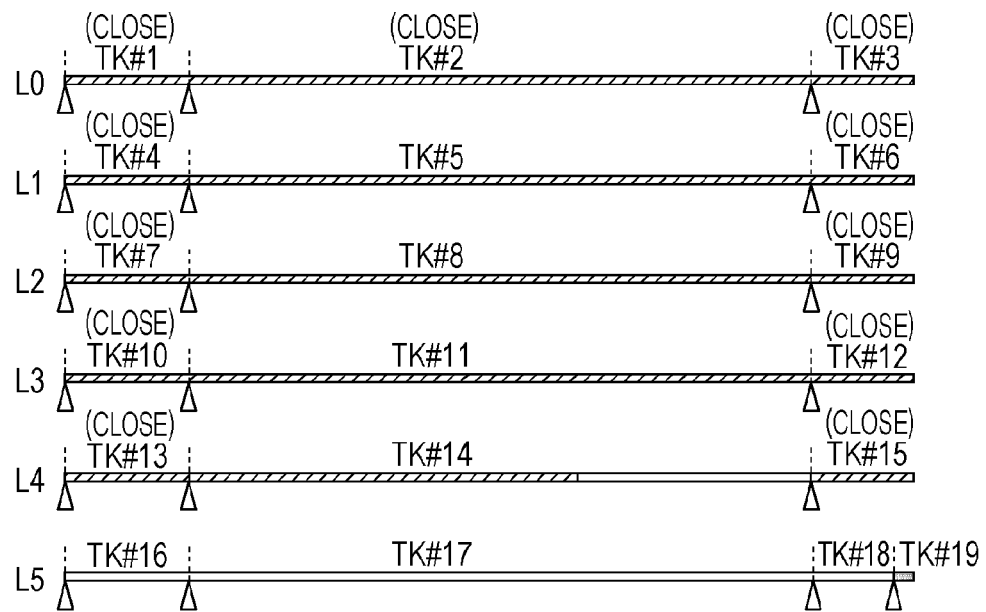

FIG. 11B illustrates a state in which tracks have been set up to the layer L5 in the same way. The tracks TK#16, TK#17, and TK#18 have been set to the layer L5. With the layer L5 alone, there is the track TK#19 where the AVDP is recorded, and accordingly, the number of tracks is four. Let us say that, with the layers L0 to L5, three tracks for each recording purpose are set thereto respectively, and moreover, each track is completed within just one layer.

As with the above-mentioned example, with the track management system according to the present embodiment, track setting processing is performed wherein multiple tracks serving as continuous recording areas are set to one layer of the multilayer recording medium 1 according to recording purpose. For example, a management information track, a user data track, and a mirror track are set. Also, closing track processing is also performed wherein each track is set to a continuous recording completed state within one layer alone. Thus, a management information file and a mirror file may be recorded in positions separated as the track TK#1 and TK#3 for example in a distributed manner, which is strong for a defect, and improves reliability of the management information (metadata and so forth). Also, recording of an management information file and a mirror file may be performed within the same layer, and operation performance is also improved. Also, recording of a management information file, user data, and a mirror file may effectively be performed on each track in each layer, and also, recording is distributed into the tracks, and accordingly, expansion of metadata in the multilayer recording medium 1 may simply be performed with high reliability being maintained.

According to recording operation, in the event that recording for a certain track of a certain layer has advanced, and the area of this track within this layer is an already recorded state, closing track processing for this track is performed. At this time, track setting processing is performed as to another layer wherein multiple tracks are set according to recording purpose. Thus, recording of user data, recording of a management information file, and recording of a mirror file may be executed using each layer. In other words, there is secured a state in which file recording with benefit of large capacity owing to multilayering being received may normally be executed. Though specific examples will be described in later-described FIGS. 13 to 16, for example, a user data track is completed in each layer, but the user data track in each layer may consecutively be used, and accordingly, capacity of each layer is not wasted. This may similarly be applied to a management information track and a mirror track.

Also, at the time of performing the track setting processing, of layers which have not been taken as a track setting processing target, the track setting processing is performed on a layer positioned at the rear-most side as viewed from the laser beam entry face side as a target. In particular, as for the multilayer recording medium 1 where no track has been set, first, as illustrated in FIG. 9B, the track setting processing is performed on the layer L0 positioned at the rear-most side as viewed from the laser beam entry face side, and also, recording operation is executed from a track of the layer L0 at the rear-most side. Also, thereafter, according to progress of recording, track setting is performed in order on the next layer on the front side. Layers are used from the rear side in order, and accordingly, each layer is prevented from being influenced by the recorded state of layers toward the front side, and consequently, suitable recording operation is ensured. In particular, as illustrated in FIGS. 10 and 11, a management information track, a user data track, and a mirror track in each layer are each set so as to be overlapped in the incident light axial direction of a laser beam. That is to say, tracks having the same purpose are disposed so as to be overlapped in the laser beam axial direction. Thus, recording of a management information file, user data, and a mirror file may be executed by using an area without waste in order from layers on the rear side. That is to say, each of a management information file, user data, and a mirror file may sequentially be recorded without being influenced by layers closer to the front side.

For example, as described above, after the state in FIG. 10A, even when performing recording of user data on the track TK#5 in the layer L1, a management information file and a mirror file may be recorded in the tracks TK#1 and TK#3 in the layer L0 which have not been closed (have not completely been used). This is because the track TK#5 where recording of user data is performed is not overlapped with the tracks TK#1 and TK#3. Accordingly, a management information file and a mirror file are recorded first using remaining areas in the tracks TK#1 and TK#3 without immediately using the tracks TK#4 and TK#6, whereby the area on the multilayer recording medium 1 may be used without waste.

4-2. Format (Initial Track Setting)

The drive control unit 101 according to the present embodiment performs the track setting processing and closing track processing to realize the above-mentioned operation. At this time, the drive control unit 101 outputs various instructions to the controller 44 for realizing the above-mentioned operation so as to realize actual file system management. Hereinafter, specific processing examples will be described. First, now, description will be made regarding an example of format processing by the drive control unit 101 at the time of a command for file system format being issued at the host apparatus 100 for example. Note that description of specific processing serving as the following format processing, or recording/closing track/track setting of the next layer will be made as processing of the drive control unit 101, but specifically, this processing may also be realized by performing this as processing of an application or OS at the host apparatus 100, or as processing of the controller 44 of the recorder/reproducer 10. Also, a WO (Write Once) type multilayer optical disc is assumed as the multilayer recording medium 1.

Figure 12:
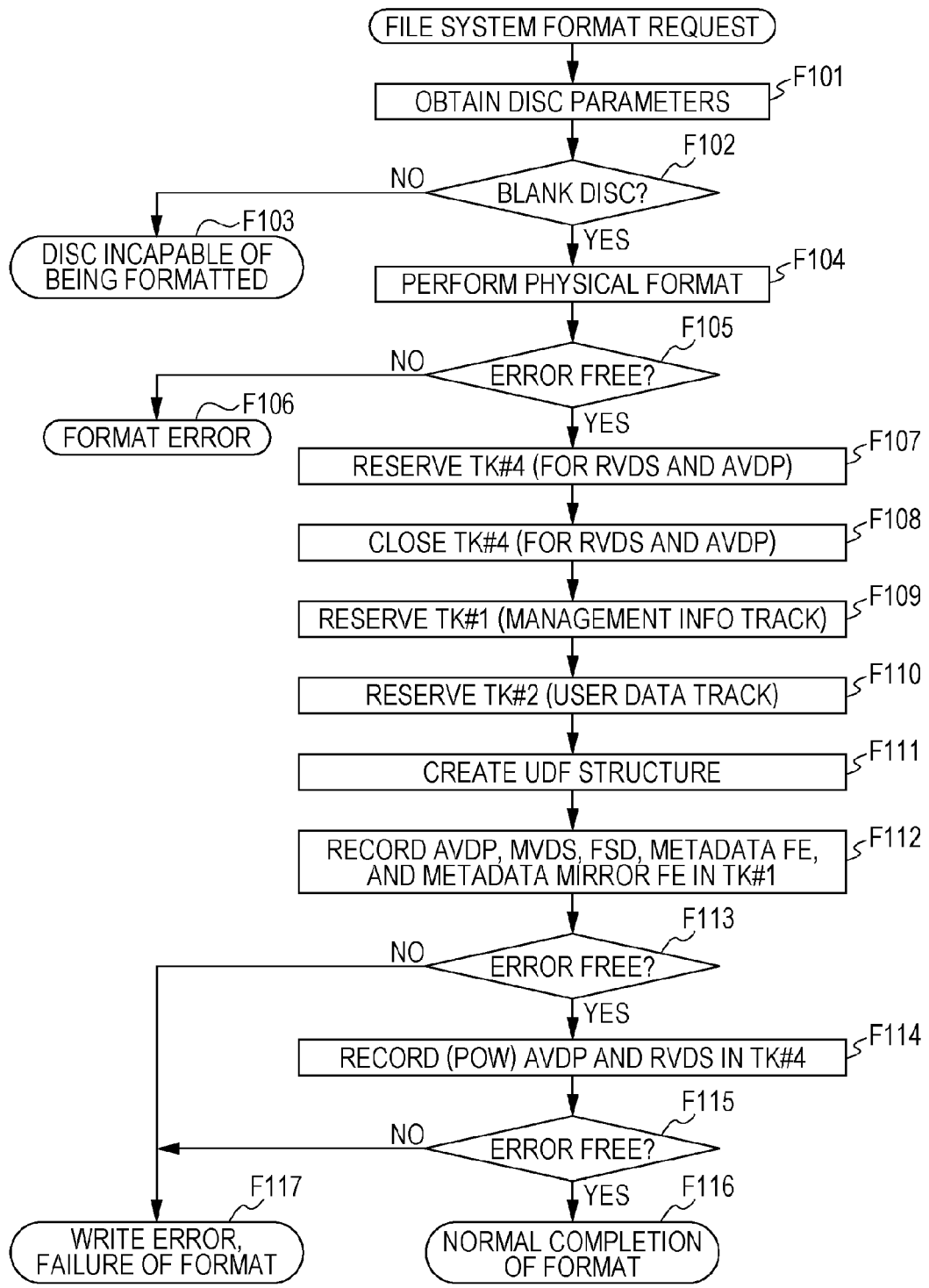
FIG. 12 is a flowchart of format processing according to the first embodiment.

FIG. 12 illustrates processing of the drive control unit 101 at the time of a format command. In the event of having received a format request, in step F101 the drive control unit 101 obtains disc parameters of the multilayer recording medium 1, and in step F102 confirms whether or not this is a blank disc. In the event of other than a blank disc, the drive control unit 101 proceeds from step F102 to F103, where the format processing is ended assuming that the currently loaded multilayer recording medium 1 is an optical disc of which formatting is inhibited.

In the event of a blank disc, the drive control unit 101 proceeds to step F104 to perform physical format. Specifically, the drive control unit 101 instructs the controller 44 of the recorder/reproducer 10 to perform physical format of the multilayer recording medium 1. In the event that there is an error in this case, the drive control unit 101 proceeds from step F105 to F106, and takes this as a format error. Upon physical format being completed, in step F107 and thereafter, the drive control unit 101 actually performs the track setting processing. In step F107, the drive control unit 101 sets (reserves) the track TK#4 to be used for recording of an AVDP or RVDS (Reserve Volume Descriptor Sequence). As illustrated in FIG. 9B, the track TK#4 is set in the rear edge portion of the layer L5 at the front-most side in a 6-layer disc, for example.

Next, in step F108, the drive control unit 101 performs close processing of the track TK#4. This is processing for setting, in accordance with the UDF regulations, an AVDP area as the track TK#4, and also closing this, and thereafter recording the AVDP in an optional location by POW. Note that the AVDP in the UDF is a point for the host first reading out, and is information whereby all of the files in the optical disc may be accessed from here. With the UDF, the AVDP is stipulated so as to be recorded in two or more locations of the sector of the logical block number (LBN) 256, the last selector (Z), and of Z-256 sectors.

Next, in step F109, the drive control unit 101 sets the track TK#1 to the layer L0 as a management information track. Further, in step F110, the drive control unit 101 sets the track TK#2 to the layer L0 as a user data track. In this state, as illustrated in FIG. 9, areas of the tracks TK#1, TK#2, and TK#4 are determined. A section between the track TK#2 and the track TK#4 becomes the track TK#3 which is transiently a mirror track.

In step F111, the drive control unit 101 creates a UDF structure. In step F112, the drive control unit 101 performs control for recording an AVDP, an MVDS (Main Volume Descriptor Sequence), a file set descriptor, a metadata file FE, and a metadata mirror file FE in the track TK#1. Specifically, the drive control unit 101 instructs the controller 44 to record these management information in the track TK#1 in the multilayer recording medium 1.

In step F113, the drive control unit 101 confirms an error of the above-mentioned recording operation, and in the event that there is no error, in step F114 performs processing for recording the AVDP and RVDS in the track TK#4. That is to say, the drive control unit 101 instructs the controller 44 to perform recording for the track TK#4. However, in this case, the track TK#4 has already been closed, and accordingly, the AVDP and RVDS are here recorded in another area by POW on the recorder/reproducer (controller 44) side. Next, in step F115, the drive control unit 101 confirms an error of the recording operation, and in the event that there is no error, in step F116, formatting has normally been completed. Note that, in the event that determination is made in step F113 or F115 that there is a write error, the processing is ended as formatting failure in step F117. Thus, the multilayer recording medium 1 is in the initial state in FIG. 9B.

4-3. Recording/Closing Track/Track Setting of Next Layer

As described in FIGS. 10A to 11B, hereinafter, closing of a track or track setting for another layer is performed in accordance with progress of recording operation. Subsequent operation will be described as processing of the drive control unit 101 in the event that a recording command (file write request) has occurred at the host apparatus 100.

Figure 13:
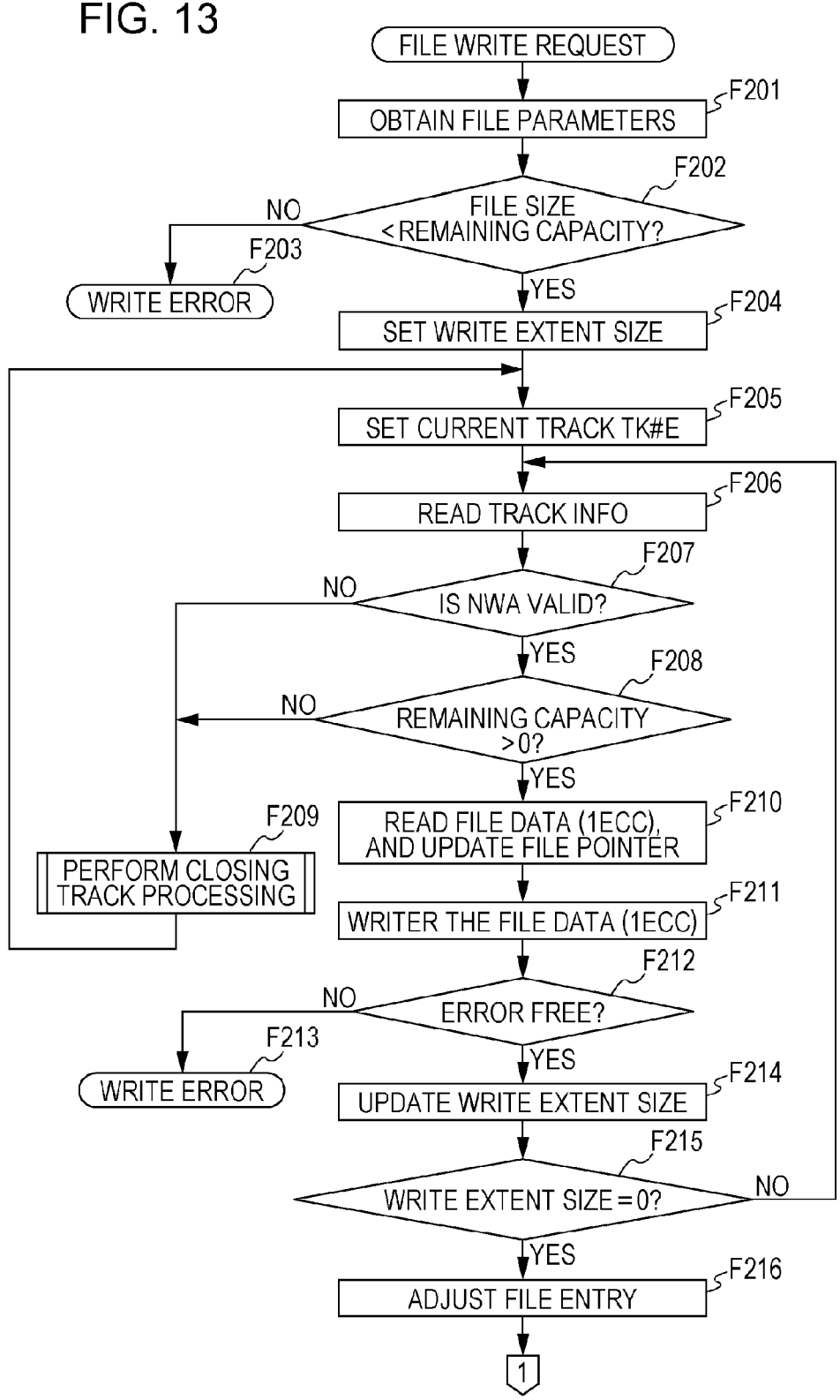
FIG. 13 is a flowchart of recording processing according to the first embodiment.
Figure 14:
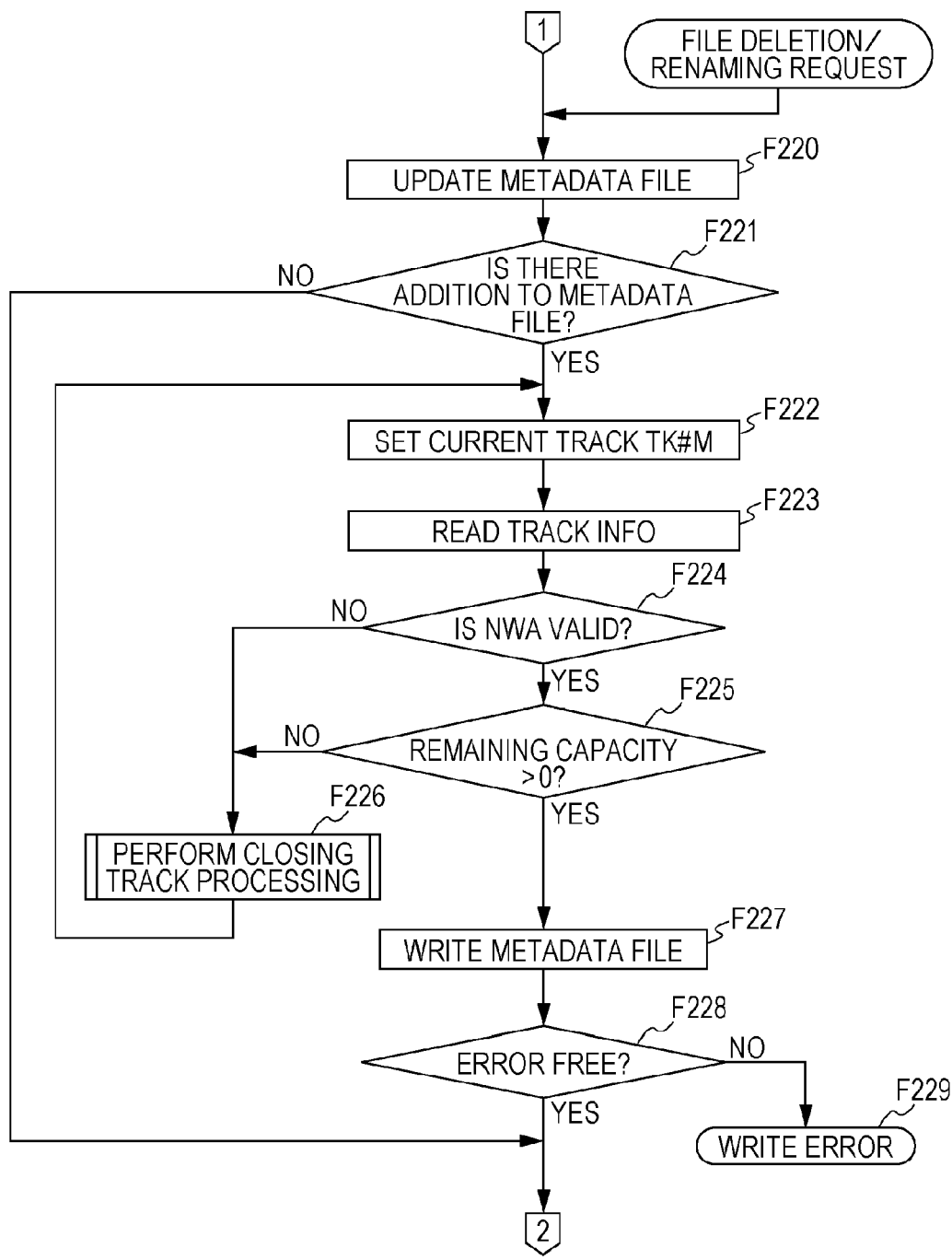
FIG. 14 is a flowchart of the recording processing according to the first embodiment.
Figure 15:
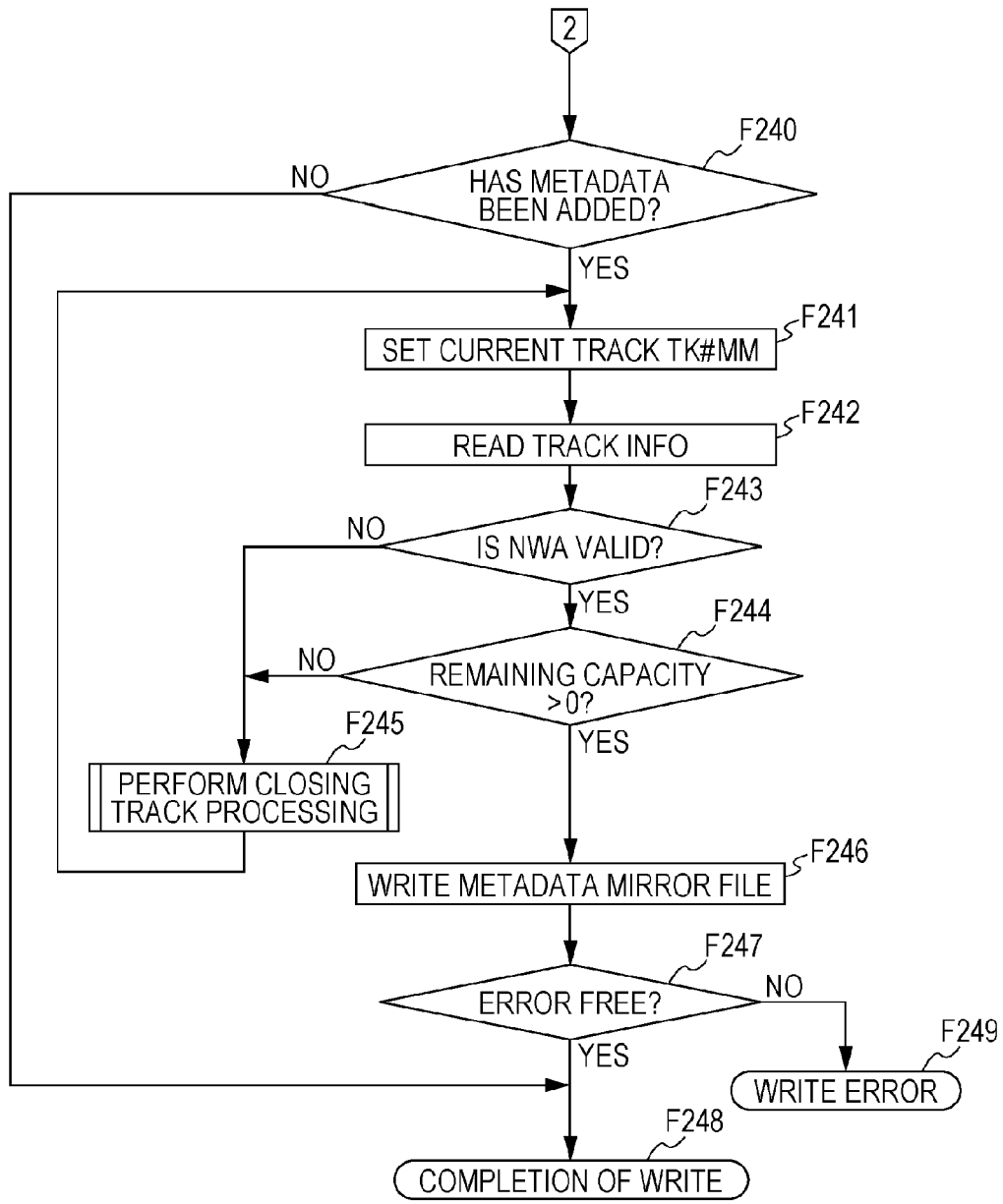
FIG. 15 is a flowchart of the recording processing according to the first embodiment.

FIGS. 13, 14, and 15 illustrate processing of the drive control unit 101 in response to occurrence of a file write request command. Upon having received a file write request, in step F201 the drive control unit 101 obtains file parameters, and confirms the file size. Specifically, the drive control unit 101 determines whether or not a user data file requested this time is recordable for the remaining capacity of the multilayer recording medium 1. In the event the file size exceeds the remaining capacity, the drive control unit 101 proceeds from step F202 to F203, and takes this file size as a write error. In the event that the file size does not exceed the remaining capacity, the drive control unit 101 proceeds from step F202 to F204, and sets a write extent size. Specifically, the drive control unit 101 sets the value of the file size as a write extent size (data size to be consecutively recorded).

Next, in step F205, the drive control unit 101 sets the current track TK#E. The current track TK#E is specified as a track where recording will be performed from now on. For example, in the event of the state in FIG. 10B, the track TK#2 is set as the current track TK#E.

In step F206, the drive control unit 101 reads track information from the management information track TK#1 (or from the contents of the management information track TK#1 already read). In steps F207 and F208, the drive control unit 101 confirms regarding the current track TK#E (e.g., TK#2) whether or not the NWA is valid, or whether or not there is a remaining capacity. The NWA is an address where sequential recording will be performed from now on, and in the event that the NWA is valid, recording has to be started from an address that the NWA thereof indicates. A case where the NWA is invalid is that the current track TK#E is in a state in which consecutive recording may not be performed for any reason. Also, with the current track TK#E thereof, in the event that the remaining capacity=0, recording may not be executed regarding the current track TK#E.

In the event that determination is made in steps F207 and F208 that the NWA is valid, and also, the remaining capacity=0, the drive control unit 101 proceeds to step F210, and performs recording processing of file data. Recording of file data is performed in increments of one ECC block, for example. Therefore, the drive control unit 101 reads out, for example, one ECC block worth of file data to be recorded in step F210 from the internal buffer or the like of the host apparatus 100, and supplies to the recording/reproducing unit 50 of the recorder/reproducer 10. Next, as step F211, the drive control unit 101 instructs the controller 44 to cause the recording/reproducing unit 50 to execute recording operation of one ECC block worth of the file data. Note that in step F210 the drive control unit 101 also performs, in order to record the next ECC block worth, updating of a file pointer that indicates the next ECC block within file data to be recorded.

In step F212, the drive control unit 101 confirms whether or not recording of this one ECC block worth has been executed without errors. In the event that an error has occurred, in step F213 the drive control unit 101 determines this recording to be a write error. In the event of error free, in step F214 the drive control unit 101 updates the write extent size. Specifically, the drive control unit 101 subtracts the size of one ECC block worth from the write extent size so that the write extent size indicates the remaining consecutive recording amount.

In step F215, the drive control unit 101 confirms whether or not the write extent size=0. As can be understood from the processing in step F214, the write extent size=0 indicates that recording of a user data file requested this time has been completed. Unless the write extent size=0, the drive control unit 101 proceeds to step F206 to confirm information of the current track TK#E. Specifically, the NWA and remaining capacity are confirmed, and in the event that these have no problem, the drive control unit 101 continuously perform recording processing of a user data file in increments of ECC blocks as steps F210 to F214.

In the event that confirmation is made in step F215 at a certain point-in-time that the write extent size=0, this means that recording of user data requested this time has been completed with the current track TK#E alone which has been set first (e.g., TK#2), and accordingly, the drive control unit 101 proceeds to updating of the management information (metadata and so forth) in step F216 and thereafter.

However, before recording of user data requested this time is completed, the current track TK#E may not be used any further. Specifically, examples of this case include a case where determination is made in step F207 that the NWA is invalid, and a case where determination is made in step F208 that the remaining capacity=0. In such a case, the drive control unit 101 performs the closing track processing in step F209.

An example of the closing track processing is illustrated in FIG. 16. First, in step F261 the drive control unit 101 confirms whether or not the current track TK#E is a track of the final layer, that is, in the event of a 6-layer disc, the front-most layer L5. In the event that the current track TK#E is a user data track of the final layer, recording may not be performed any further, and accordingly, in step F266 the controller 44 takes this as a write error. In the event that the current track TK#E is not included in the final layer, the drive control unit 101 proceeds to step F262 to perform close processing on the current track TK#E. Next, in step F263, the drive control unit 101 confirms whether or not track setting (setting of a management information track, a user data track, and a mirror track) has already been performed on the next layer toward the front side. In the event that track setting has not been performed, the drive control unit 101 proceeds to step F264 to set three tracks (a management information track, a user data track, and a mirror track) to the next layer, and ends the processing in FIG. 16.

Note that at the point-in-time in step F263, track setting has already been performed on the next layer, track setting does not have to be performed here. In this case, in step F265 the drive control unit 101 confirms whether or not the same type of track (user data track in this case) in the next layer is active (=not closed), and in the event of active, ends the processing in FIG. 16. In the event of not active, in step F266 the drive control unit 101 takes this as a write error.

The above-mentioned processing is processing in the case illustrated in FIG. 10A or FIG. 10B, for example. Specifically, in the case of FIG. 10A, with a recording process of user data, the user data track TK#2 has completely been used, and accordingly, in step F264 three tracks TK#4, TK#5, and TK#6 are set to the layer L1. Note that a case where the tracks have already been set in the next layer in step F263 is, for example, as illustrated in FIG. 11A, a case where the management information track in the layer L2 has completely been used, track setting has been performed on the layer L3, and at a point-in-time thereafter, the user data track TK#8 in the layer L2 has completely been used, and the drive control unit 101 has proceeded to step F263. In this case, the user data track TK#11 has already been set to the next layer L3.

Now, processing of track setting for the next layer to be performed in step F264 will be described. At the time of track setting, this processing is processing for obtaining data capacity per one layer, and performing track division using the value thereof. The data capacity mentioned here means capacity of an area which may be used as a track. The track division mentioned here means, for example, with the state in FIG. 9B, that from a state in which the track TK#3 is set immediately before of the track TK#4 in the layer L5, this track TK#3 is divided, and as illustrated in FIG. 10A, tracks TK#4, TK#5, and TK#6 are set to the layer L1.

Figure 17A:
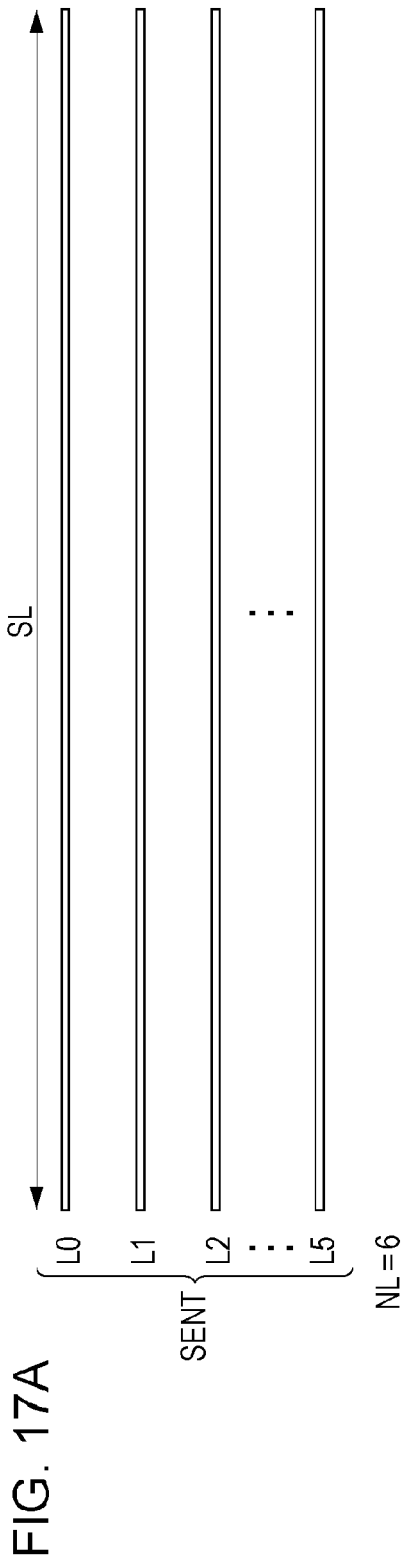
FIGS. 17A and 17B are explanatory diagrams of user data capacity acquisition per one layer according to the first embodiment.
Figure 17B:
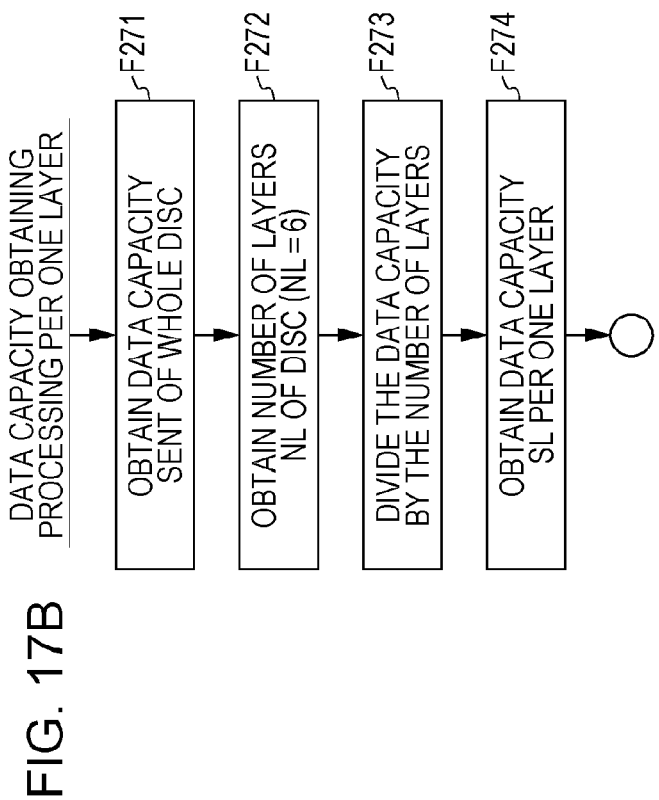

FIGS. 17A and 17B illustrate a technique for obtaining data capacity per one layer. As illustrated in FIG. 17A, let us say that the data capacity of the entire multilayer recording medium 1=SENT, the data capacity of one layer=SL, and the number of layers NL=6. FIG. 17B illustrates data capacity obtaining processing per one layer that the drive control unit 101 performs. In step F271, the drive control unit 101 obtains the data capacity SENT of the entire multilayer recording medium 1 from the controller 44. In step F272, the drive control unit 101 obtains the number of layers NL of the multilayer recording medium 1. The controller 44 may obtain these information from the management information of the multilayer recording medium 1. In step F273, the drive control unit 101 divides the data capacity SENT by the number of layers NL. Next, in step F274, the drive control unit 101 obtains the data capacity SL of one layer as a division result.

Figure 18A:
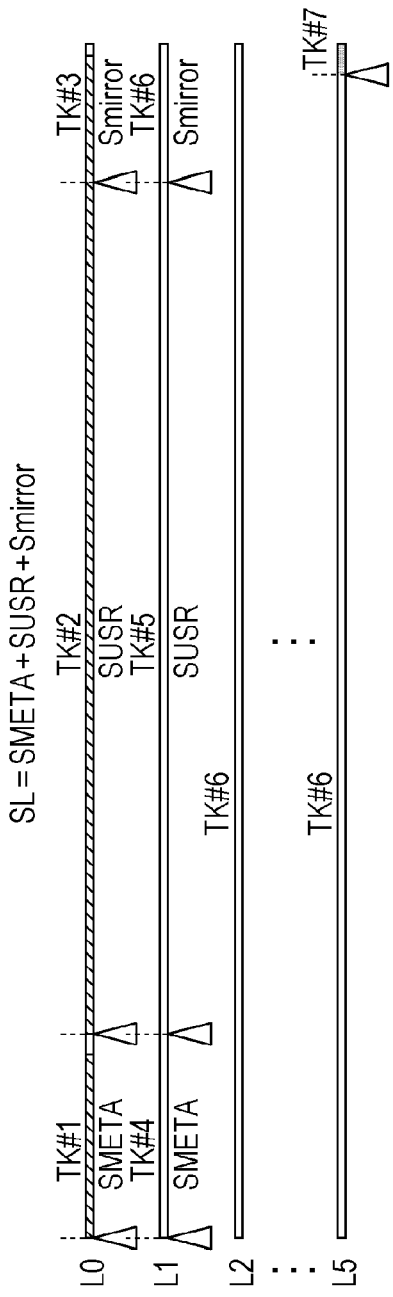
FIGS. 18A and 18B are explanatory diagrams of a scene of track division in increments of layers according to the first embodiment.
Figure 18B:
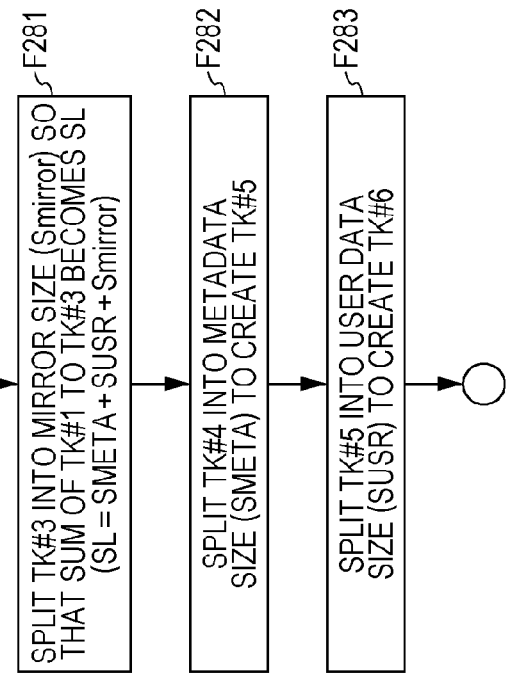

FIGS. 18A and 18B illustrate track division processing. As illustrated in FIG. 18A, for example, let us assume a case where at the time of the track TK#2 in the layer L0 being closed, the tracks TK#4, TK#5, and TK#6 are set to the layer L1. As illustrated in FIG. 18B, first, in step F281 the drive control unit 101 splits the track TK#3 so that summation of the capacities of the tracks TK#1, TK#2, and TK#3 is the data capacity SL of one layer. Specifically, the drive control unit 101 divides the mirror track TK#3 so as to satisfy SL=SMETA+SUSR+Smirror regarding capacity SMETA of a management information track TK#1, capacity SUSR of a user data track TK#2, and capacity Smirror of a mirror track TK#3. At this point-in-time, from the head and thereafter of the layer L2 becomes a track TK#4. Next, in step F282, the drive control unit 101 splits this track TK#4 with the capacity SMETA. Thus, the track TK#4 becomes a track having the same size as with the track TK#1 and also overlapped in the laser beam axial direction, and thereafter becomes a track TK#5. Next, in step F283, the drive control unit 101 splits this track TK#5 with the capacity SUSR. Thus, the track TK#5 becomes a track having the same size as with the track TK#2 and also overlapped in the laser beam axial direction, and thereafter becomes a track TK#6.

According to the above-mentioned processing, the tracks TK#4, TK#5, and TK#6 have been set to the layer L1. Note that a track which has been taken as the track TK#4 at first in layer L5 where recording of an AVDP is performed is postponed to become a track TK#7 in accordance with the above-mentioned track division. The case of the layer L1 has been described here, but in cases leading to FIGS. 10B, 11A, and 11B as well, similar track division processing will be performed, whereby tracks will be set.

Upon finishing the closing track processing (and track setting processing for the next layer) in FIG. 16, the drive control unit 101 returns to step F205 in FIG. 13 to set the current track TK#E. In this case, the user data track in the next layer which has newly been set (or has already been set) is taken as the current track TK#E. Next, recording of user data is executed on the current track TK#E for each one ECC block worth by the processing in steps F206 to F214.

In this manner, even in the event that a user data track has been closed in a certain layer, recording of user data may continuously be executed using a user data track in the next layer in a consecutive manner, and accordingly, the area of each layer is effectively used.

Upon recording of user data requested this time being completed after the write extent size becomes 0 in step F215, the drive control unit 101 proceeds to step F216 to perform adjustment of a file entry according to recording of user data of this time. Next, the drive control unit 101 proceeds to step F220 in FIG. 14 to perform updating of the contents of a metadata file according to modification of a file entry. In step F221, the drive control unit 101 determines whether or not additional writing onto the multilayer recording medium 1 of the metadata file has to be performed. For example, determination is made whether or not the contents of the metadata file has been changed, or whether or not this is actually timing for updating the metadata file on the multilayer recording medium 1, or the like. In the event that writing onto the multilayer recording medium 1 is not performed, the drive control unit 101 proceeds to FIG. 15.

In the event of writing the metadata file into the multilayer recording medium 1, the drive control unit 101 proceeds to step F222 to set the current track TK#M. The current track TK#M is specified as a track where recording of the management information (metadata file) is performed. For example, in the event of the state in FIG. 9B, the track TK#1 is set as the current track TK#M.

In step F223, the drive control unit 101 reads track information regarding the current track TK#M (e.g., management information track TK#1). In steps F224 and F225, confirmation is made regarding the current track TK#M whether or not the NWA is valid, and whether or not there is the remaining capacity.

Unless the NWA is valid, and also the remaining capacity=0, the drive control unit 101 proceeds to step F227 to perform recording processing of a metadata file to the current track TK#M. In step F228, the drive control unit 101 confirms whether or not recording of this metadata file has been executed without errors. In the event that an error has occurred, in step F229 the drive control unit 101 takes this recording as a write error. In the event of error free, the drive control unit 101 proceeds to processing in FIG. 15.

Here, determination may be made in step F224 that the NWA of the current track TK#M is invalid, or determination may be made in step F225 that the remaining capacity=0. In these cases, the drive control unit 101 performs closing track processing in step F226. The closing track processing is as described in FIG. 16. In this case, for example, in the event that the management information track TK#1 which is the current track TK#M has been closed, and track setting has not been performed on the next layer, three tracks (management information track, user data track, and mirror track) are set. In the event that the three tracks have already been set, track setting does not have to be performed. Next, the drive control unit 101 returns to step F222 in FIG. 14 to set the current track TK#M. In this case, a management information track (e.g., TK#4) in the next layer which has newly been set (or has already been set) is taken as the current track TK#M. Next, recording of the metadata file is executed on the current track TK#M by the processing in steps F223 to F228. In this manner, even when a management information track is closed in a certain layer, recording of the management information such a metadata file and so forth may continuously be executed using a management information track in the next layer in a consecutive manner.

Upon the processing regarding recording of a metadata file illustrated in FIG. 14 being completed, the drive control unit 101 proceeds to step F240 in FIG. 15. In the event that the above-mentioned addition of a metadata file has not been performed this time, the drive control unit 101 directly proceeds to step F248 to take this as completion of writing. In the event that recording of a metadata file which has been described in FIG. 14 has been performed, the drive control unit 101 subsequently performs writing of a metadata mirror file.

In the event of writing a metadata mirror file in the multilayer recording medium 1, the drive control unit 101 proceeds to step F241 to set the current track TK#MM. The current track TK#MM is specified as a track where recording of a metadata file mirror will be performed from now on. For example, in the event of the state in FIG. 9B, the track TK#3 is set as the current track TK#MM.

In step F242, the drive control unit 101 reads track information regarding the current track TK#MM (e.g., management information track TK#3). In steps F243 and F244, the drive control unit 101 confirms regarding the current track TK#MM whether or not the NWA is valid, and also whether or not there is the remaining capacity.

In the event that the NWA is valid, and also the remaining capacity=0, the drive control unit 101 proceeds to step F246 to perform recording processing of a metadata mirror file to the current track TK#MM. In step F247, the drive control unit 101 confirms whether or not recording of this metadata mirror file has been executed without errors. In the event that an error has occurred, in step F249 the drive control unit 101 takes this writing as a write error. In the event of error free, the drive control unit 101 proceeds to step F248 to end a series of control procedures regarding writing of user data.

In the event that determination is made in step F243 that the NWA of the current track TK#M is invalid, or determination is made in step F244 that the remaining capacity=0, the drive control unit 101 performs closing track processing in step F245. The closing track processing is as described in FIG. 16. In this case, for example, in the event that the mirror track TK#3 which is the current track TK#MM has been closed, and track setting has not been performed on the next layer, three tracks (management information track, user data track, and mirror track) are set. In the event that the three tracks have already been set, track setting does not have to be performed. Next, the drive control unit 101 returns to step F241 in FIG. 15 to set the current track TK#MM. In this case, a mirror track (e.g., TK#6) in the next layer which has newly been set (or has already been set) is taken as the current track TK#MM. Next, recording of the metadata mirror file is executed on the current track TK#MM by the processing in steps F242 to F247. In this manner, even when a mirror track is closed in a certain layer, recording of a metadata mirror file may continuously be executed using a mirror track in the next layer in a consecutive manner.

Note that the above-mentioned processing is processing according to a write request for user data, but in the event that a request command such as file deletion, renaming (change in a file name), or the like has occurred, rewriting (additional writing) of a management information file or mirror file is performed instead of recording of user data. In this case, step F220 and thereafter in FIG. 14 will be executed. Accordingly, a management information track or mirror track may be consumed without recording of user data, and as exemplified in FIG. 11A, a management information track or mirror track may be completely used in a certain layer prior to a user data track. In such a case as well, in the same way as described above, closing track processing, and three-track setting processing for the next layer are performed.

For example, the above-mentioned processing is performed as a specific processing example, whereby the above-mentioned advantages are realized. Specifically, there may be realized improvement in reliability, improvement in performance, sequential recording using the layers and unwasted capacity use of the multilayer recording medium 1 owing thereto, assurance of data recording operation without being influenced by layers on the front side, and so forth.

5. Second Embodiment 5-1. UDF Multisession

As a second embodiment, description will be made regarding an example wherein the multilayer recording medium 1 is managed with a multisession configuration, and session closing processing is performed for each layer. In particular, the session closing processing is performed in order from a layer serving as the rear side as viewed from the laser entry face side.

FIG. 19A illustrates an example of multisession recording conforming to the UDF. As with the drawing, with one session, a volume recognition area to be used for consecutive recording is started with an interval of 16 sectors from the LSN (Logical Sector Number). An anchor point is disposed in the position of the $256^{th}$ sector, and in the position of the last sector N-256 sector. Multiple UDS sessions having such a format are set as illustrated in FIG. 19B. The UDF sessions are managed at a UDF file system. Also, each of the sessions is recorded using a VAT (Virtual Allocation Table).

The present embodiment has a multisession configuration for closing sessions for each layer as a method for performing recording using the VAT as to the multilayer recording medium 1 in which when recording is performed on a layer on the front side, recording may not be performed on a layer on the rear side. Thus, the VAT is realized with a multilayer write-once disc.

Heretofore, in the event of applying the VAT with a write-once medium, a procedure for finally recording an AVDP in the head and the tail end has been performed. Therefore, in the event of a recording medium where recording may not be performed on a layer on the rear side when a layer on the front side is recorded, application of the VAT has not been allowed.

Therefore, in the event of performing recording in order from a layer on the rear side, the AVDP is updated in increments of layers by having a multisession configuration for each layer so as to have consistency in the UDF. Also, at this time, recording is not first performed on a layer on the front side, and accordingly, there may be avoided a situation where recoded data become a shadow, which precludes recording of a layer on the rear side.

5-2. Format

Figure 20A:
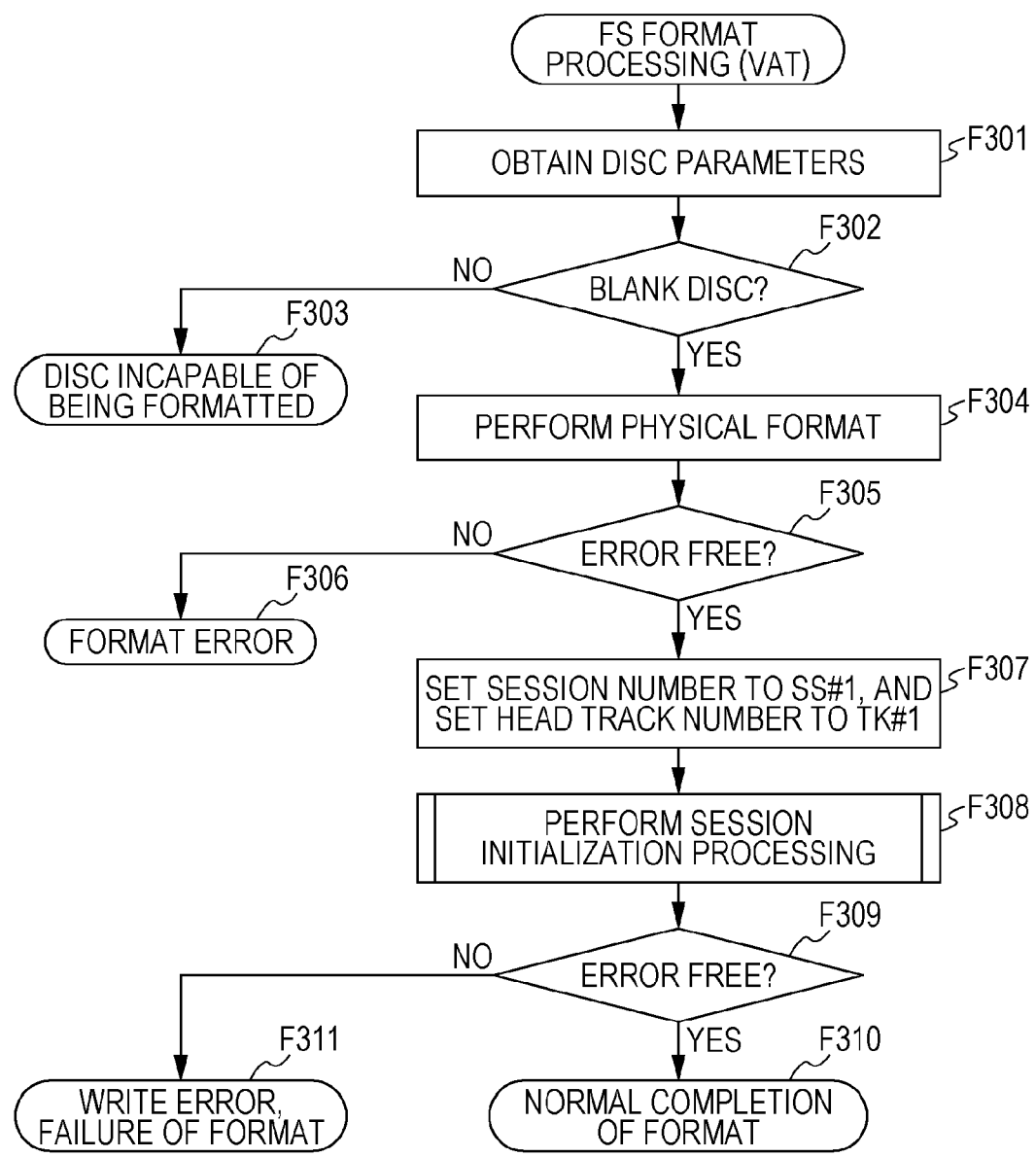
FIGS. 20A and 20B are flowcharts of format processing according to a second embodiment.

FIG. 20A illustrates file system format processing to be performed by the drive control unit 101. Now, though description will be made as format processing of the drive control unit 101 at the time of a file system format command occurring at the host apparatus 100, this format processing and session closing processing in FIG. 21A may be performed as an application or OS at the host apparatus 100, or further processing of the controller 44 of the recorder/reproducer 10 according to a format command or the like. Also, with the present second embodiment as well, a WO (Wire Once) multilayer optical disc is assumed as the multilayer recording medium 1.

As illustrated in FIG. 20A, upon format request having been received, in step F301 the drive control unit 101 obtains disc parameters of the multilayer recording medium 1, and confirms whether this disc is a blank disc.

In the event of other than a blank disc, the drive control unit 101 proceeds from step F302 to F303, and ends the format processing by determining that the current loaded multilayer recording medium 1 is an unformattable optical disc.

In the event of a blank disc, the drive control unit 101 proceeds to step F304 to perform physical formatting. In the event that there is an error, the drive control unit 101 proceeds from step F305 to F306 to take this as a format error.

Upon physical formatting being completed, in step F307 and thereafter the drive control unit 101 performs session setting processing.

First, in step F307, the drive control unit 101 sets a session number SS#1, and the head track number TK#1, and in step F308 performs session initialization processing.

Figure 20B:
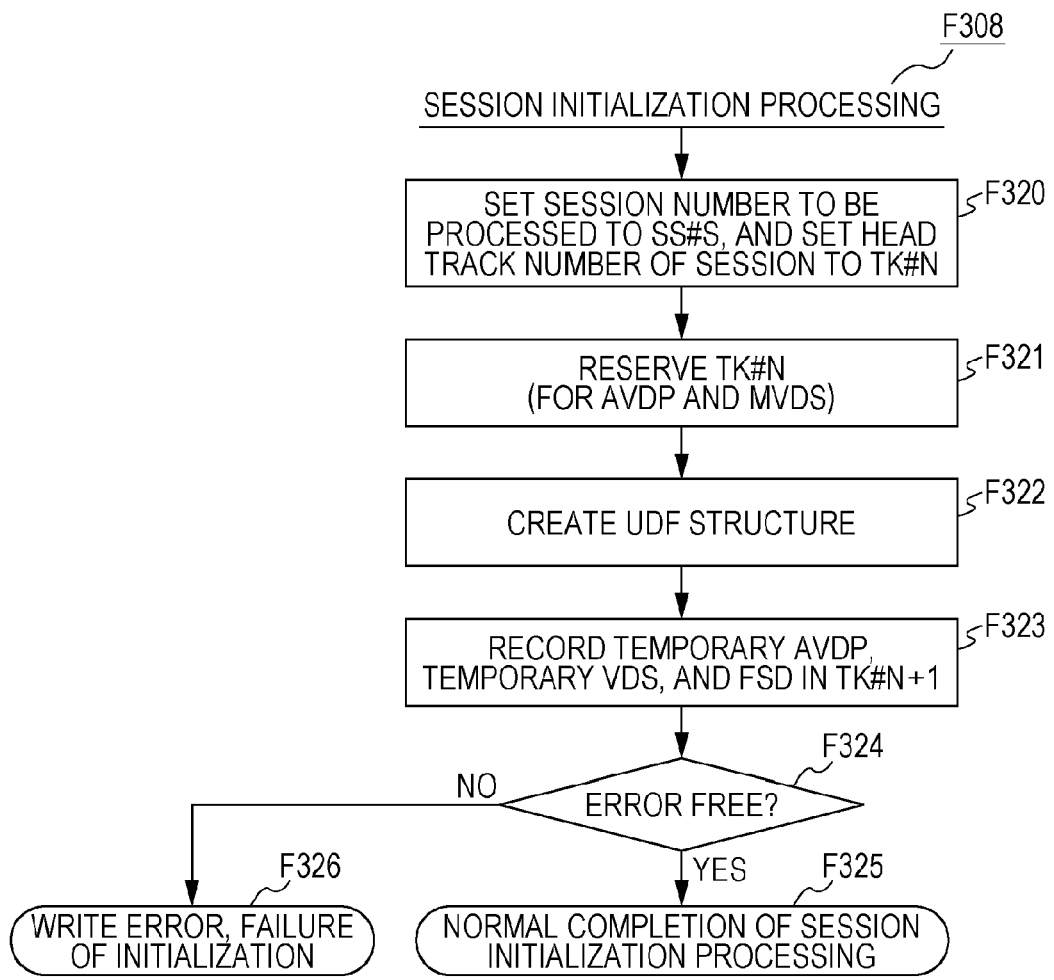

FIG. 20B illustrates details of the session initialization processing.

In step F320, the drive control unit 101 sets a target session number SS#S, and the head track TK#N of a session. In this case, the target session number SS#S becomes SS#1, and the track TK#N becomes TK#1.

Figure 22A:
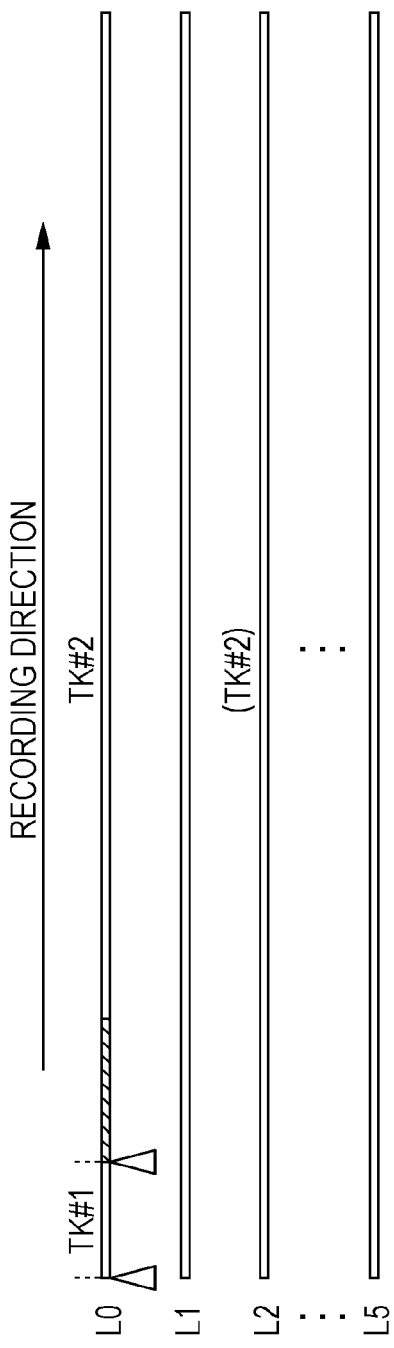
FIGS. 22A and 22B are explanatory diagrams of a scene of a session according to the second embodiment.

In step F321, the drive control unit 101 sets the track TK#N for an AVDP and an MVDS. Thus, for example, as illustrated in FIG. 22A, the track TK#1 of the layer L0 is set, and further, an area toward the rear from the track TK#1 transiently becomes a track TK#2.

In step F322, the drive control unit 101 creates a UDF structure. In step F323, the drive control unit 101 performs control for recording a temporary AVDP (Temporary Anchor Volume Descriptor Pointer), temporary VDS (Temporary Volume Descriptor Sequence), and file set descriptor in the track TK#N+1 (=TK#2).

In step F324, the drive control unit 101 confirms an error of the above-mentioned recording operation, and in the event of error free, in step F325 determines the session initialization as normal completion. On the other hand, in the event of an error, in step F326 the drive control unit 101 determines this to be failure of the session initialization.

In step F308 in FIG. 20A, the drive control unit 101 performs the session initialization as described above. In the event of error free in the initialization, the drive control unit 101 proceeds from step F309 to F310 to determines the format processing as normal completion. In the event that there is an error, the drive control unit 110 proceeds to step F311 to determine this as format failure.

Thus, the multilayer recording medium 1 is in an initial state in FIG. 22A. A temporary AVDP or the like is recorded in the track TK#2, and thereafter, recording of user data or additional recording for updating of the temporary AVDP or the like is performed on the track TK#2.

5-3. Session Closing

Figure 21A:
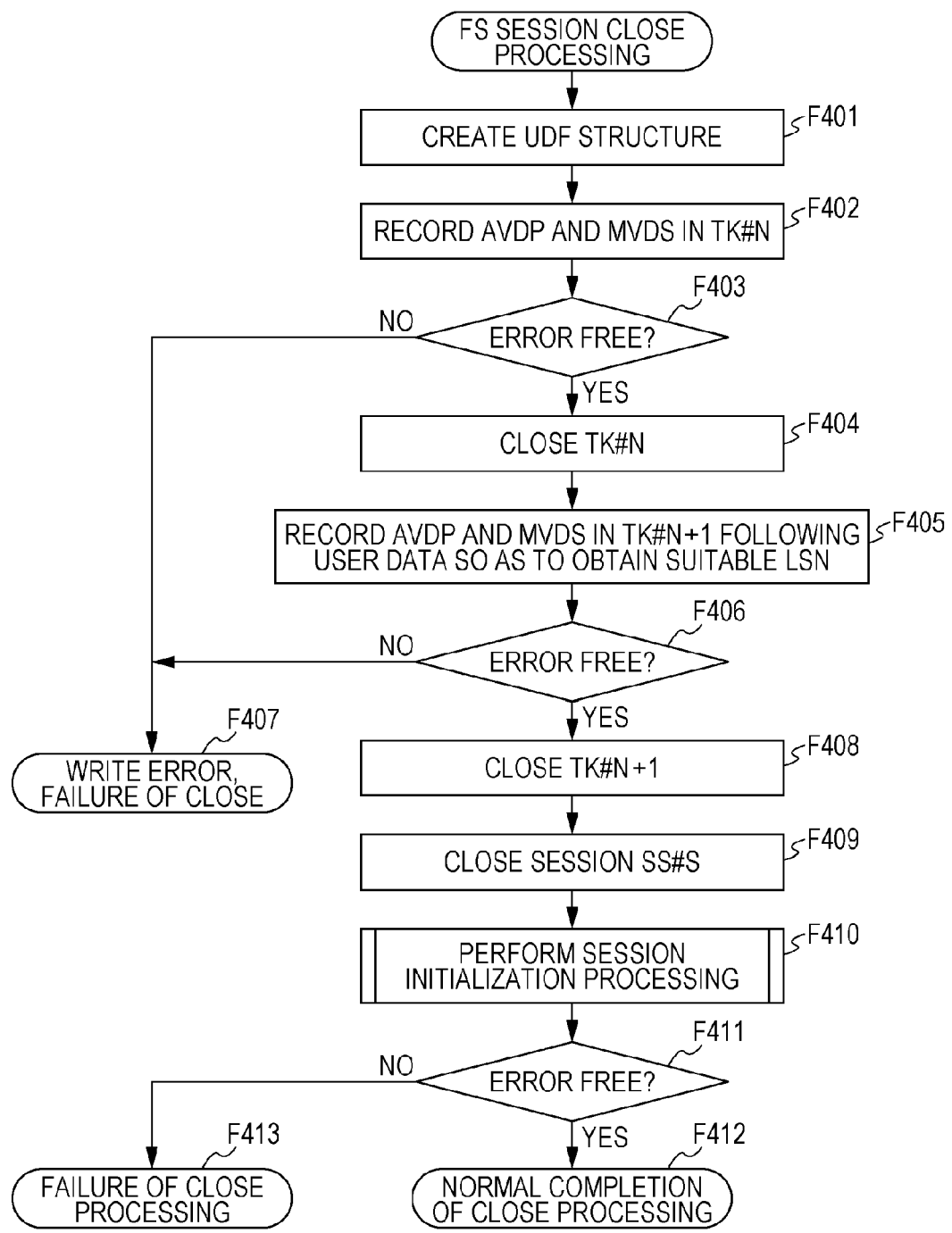

Next, the session closing processing will be described with reference to FIGS. 21A-B. At the time of session closing, in step F401 the drive control unit 101 creates a UDF structure of a target session. In step F402, the drive control unit 101 performs processing for recording an AVDP and an MVDS in the track TK#N (TK#1 at the time of closing of the layer L0). Specifically, the drive control unit 101 causes the controller 44 of the recorder/reproducer 10 to execute recording of the AVDP and MVDS in the track TK#N.

In the event of occurrence of a recording error, the drive control unit 101 proceeds from step F403 to F407 to determine this recording as failure of closing.

Upon recording of the AVDP and MVDS being normally completed, in step F404 the drive control unit 101 performs processing for closing the track TK#N (e.g., TK#1).

Next, in step F405, the drive control unit 101 performs processing for recording the AVDP and MVDS following user data in the position of a suitable LSN, for example, in the position of the last sector N-256 sector, in track TK#N+1 (e.g., TK#2).

In the event of occurrence of a recording error, the drive control unit 101 proceeds from step F403 to F407 to determine this recording as closing failure.

Figure 22B:
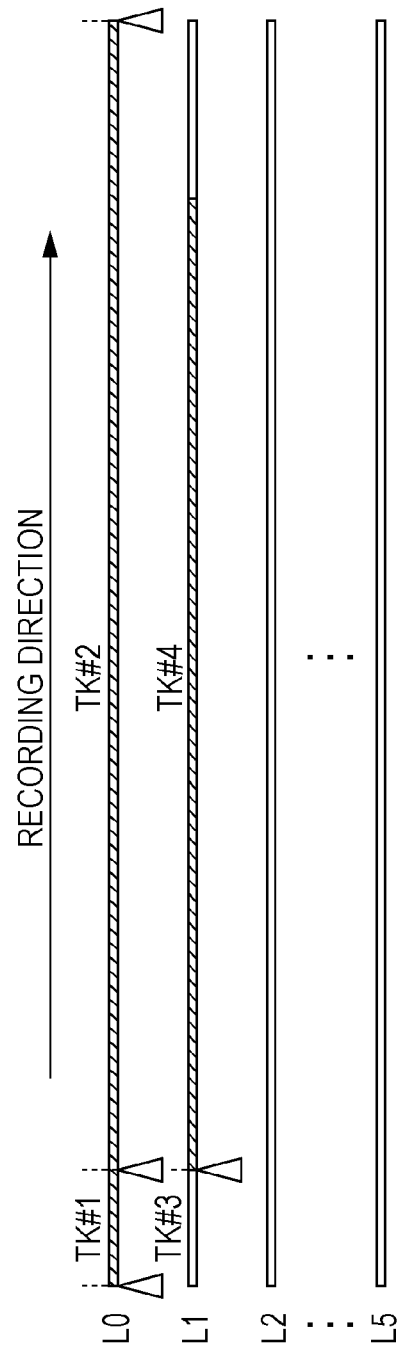

Upon recording of the AVDP and MVDS in the track TK#N+1 being normally completed, in step F408 the drive control unit 101 performs processing for closing the track TK#N+1 (e.g., TK#2). In this case, the track TK#N+1 after closing is set so as to complete within the layer L0 as illustrated in FIG. 22B.

In step F409, the drive control unit 101 closes the session SS#S (e.g., session SS#1). Accordingly, for example, the layer L0 is taken as the one session SS#1.

Next, in step F410, the drive control unit 101 performs the session initialization processing.

FIG. 21B illustrates the session initialization processing. However, steps F420 to F426 are the same as steps F320 to F326 in FIG. 20B. For example, as described above, in the event of processing after closing the session SS#1 of the layer L0, the target session number SS#S in step F420 becomes SS#2, and the head track TK#N becomes TK#3.

In step F421, the controller 44 sets the track TK#N (=TK#3) as a track for the AVDP and MVDS. Thus, for example, as illustrated in FIG. 22B, the track TK#3 of the layer L1 is set, and further, an area further to the rear than the track TK#3 transiently becomes the track TK#4.

In step F422, the drive control unit 101 creates a UDF structure. Next, in step F423, the drive control unit 101 performs control for recording the temporary AVDP, temporary VDS, and file set descriptor in the track TK#N+1 (=TK#4).

In step F424, the drive control unit 101 confirms an error of the above-mentioned recording operation, and in the event of error free, in step F425 the drive control unit 101 determines the session initialization as normal completion. On the other hand, in the event that there is an error, in step F426 the drive control unit 101 determines the session initialization as failure of the session initialization.

In step F410 in FIG. 20A, the drive control unit 101 performs the session initialization, and the next session is set following a session closed by this. In the event that there is no error in the session initialization, the drive control unit 101 proceeds from step F411 to F412 to determine the session closing processing as normal completion. In the event that there is an error, in step F413 the drive control unit 101 determines the session closing processing as closing failure.

Thereafter as well, for the multilayer recording medium 1, recording of user data or additional recording for updating of the temporary AVDP or the like is performed on the track TK#4 in FIG. 22B. A session is closed in the processing in FIGS. 21A-B accompanied with progress of recording of the track TK#4 or the like, and a new session SS#3 is set to the next layer L2 at the same time.

Consequently, multiple tracks according to the recording purpose are set for each layer, such as a track (e.g., track TK#1) of which the purpose is recording of final management information (AVDP, MVDS), and a track (e.g., track TK#2) of which the purpose is recording of user data or transient management information. Moreover, a management mode of a multisession system is taken wherein one session is completed for each layer. Thus, employing the VAT with a multilayer write once disc as described above may be realized.

6. Modifications

Though the embodiment has been described so far, various modifications and applications may be conceived regarding the present disclosed technology. With the embodiment, though three tracks according to a recording purpose have been set to one layer, two or four or more tracks may be set depending on an employed file system, management information format, or the like. This may be applied to a case of employing the multisession configuration according to the second embodiment.

Also, with a processing example of the embodiment, though description has been made assuming that the drive control unit 101 performs the track setting processing, closing track processing, and so forth, these processes are realized as a program for controlling a central processing unit in the host apparatus 100. For example, these processes may be realized by software serving as a device driver for the recorder/reproducer 10. Also, the controller 44 of the recorder/reproducer 10 may perform the track setting processing and closing track processing instead of the host apparatus 100 side. In this case, the controller 44 (central processing unit) has to operate based on a program serving as firmware causing the controller 44.

Such a program may be recorded in an HDD serving as a recording medium housed in a device such as a computer device or the like, ROM within a microcomputer including a CPU, or the like beforehand. Alternatively, such a program may temporarily or permanently be stored (recorded) in a removable recording medium such as a flexible disk, CD-ROM (Compact Disc Read Only Memory), an MO (Magnet optical) disk, DVD, Blu-ray Disc (registered trademark), a magnetic disk, semiconductor memory, a memory card, or the like. Such a removable recording medium may be provided as so-called package software. Also, such a program may not only be installed into a personal computer or the like from a removable recording medium but also be downloaded from a download site via a network such as a LAN (Local Area Network), the Internet, or the like.

Also, with regard to the multilayer recording medium 1, there is also a way of thinking wherein the number of layers to be recorded at the same time is restricted. For example, though not touched in the embodiments, allocation of an OPC (Optimum Power Control) area for adjusting laser power has to be devised so that a layer on the rear side does not receive influence of layer OPC processing on the front side.

In such a case, restricting layers to be recorded at the same time to three layers of six layers for example, may be conceived.

For example, the layers L0 to L2 are first taken as the layers to be recorded, and in the event that recording to the layer L3 has to be performed, track setting is performed on the layer L3, and the layers L1 to L3 are taken as recording targets. In the event of employing such a technique as well, the operations in the embodiments are suitable.

Also, the multilayer recording medium 1 and recorder/reproducer 10 according to the embodiment are just an example. The configuration of the multilayer recording medium 1 and the configuration of the recorder/reproducer 10 may variously be conceived. Also, the multilayer recording medium 1 serving as an optical disc has been illustrated as an example, but a recording medium to which the present disclosed technology may be applied is not restricted to an optical-disc-shaped recording medium. For example, the present disclosed technology may also be applied to a card-shaped recording medium, or a recording apparatus corresponding thereto.

Note that the present technology may also employ the following configurations.

(1) A recording management apparatus including: a control unit configured to perform track setting processing arranged to set, by recording purpose, a plurality of tracks serving as continuous recording areas to one layer of a recording medium having a plurality of layers serving as recording layers where recording of information is performed by laser irradiation, and closing track processing arranged to set each track to a continuous recording completed state within one layer alone.

(2) The recording management apparatus according to (1), wherein the control unit performs, in the event that according to recoding operation, recording to a certain track in a certain layer has advanced, and an area of this track within this layer is in an already recorded state, the closing track processing regarding this track.

(3) The recording management apparatus according to (1) or (2), wherein the control unit performs, in the event of having performed the closing track processing regarding a certain track in a certain layer, track setting processing arranged to set a plurality of tracks to another layer by recording purpose.

(4) The recording management apparatus according to any of (1) to (3), wherein the control unit performs, at the time of performing the track setting processing, the track setting processing with a layer on the rear-most side as viewed from the laser entry face side as a target, of layers which have not been taken as a target of the track setting processing.

(5) The recording management apparatus according to any of (1) to (4), wherein the control unit first performs, for a recording medium where no track has been set, the track setting processing on a rear-most layer as viewed from the laser entry face side, and also executes recording operation by the recording unit from a track in this layer on the rear-most side, and sequentially performs the track setting processing on a layer on the front side as viewed from the laser entry face side according to progress of recording operation.

(6) The recording management apparatus according to any of (1) to (5), wherein the control unit sets, as the track setting processing, at least a management information track of which the recording purpose is to record management information, a user data track of which the recording purpose is to record user data, and a mirror track of which the recording purpose is to record mirror data of the management information.

(7) The recording management apparatus according to (6), wherein the control unit sets the tracks so that each of the management information track in each layer, the user data track in each layer, and the mirror track in each layer are overlapped in the incident light axial direction of a laser beam.

(8) The recording management apparatus according to (1), wherein the control unit sets a recording medium to a state managed with a multisession configuration, and also, session closing processing is executed for each layer.

(9) The recording management apparatus according to (8), wherein the control unit performs session closing processing in order from a layer serving as the rear side as viewed from the laser entry face side.

The present disclosure contains subject matter related to that disclosed in Japanese Priority Patent Application JP 2012-140793 filed in the Japan Patent Office on Jun. 22, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording management apparatus comprising:
    a control unit configured to:
        perform track setting processing to set a first plurality of tracks serving as continuous recording areas to a first layer of a plurality of layers serving as recording layers of a recording medium,
        wherein recording of information on the recording medium is performed by laser irradiation; and
        closing track processing to set one track of the first plurality of tracks to a continuous recording completed state within the first layer before setting a second plurality of tracks in a second layer of the plurality of layers for recording the information.

2. The recording management apparatus according to claim 1, wherein the control unit performs the closing track processing for one of the first plurality of tracks, when recording to the one of the first plurality of tracks in the first layer has started, and an area of the first plurality of tracks within the first layer is in a recorded state.

3. The recording management apparatus according to claim 1, wherein the control unit performs, at the time of performing the track setting processing, the track setting processing with a layer on a rear-most side as viewed from the laser entry face side as the first layer, of the plurality of layers which have not been taken as a target of the track setting processing.

4. The recording management apparatus according to claim 1, wherein the control unit performs,
    the track setting processing on a rear-most layer as viewed from the laser entry face side when no track of the plurality of tracks has been set for a recording medium, and
    executes recording operation from a track of the first plurality of tracks in the rear-most layer on a rear-most side as viewed from the laser entry face side, and
    sequentially performs the track setting processing on the second layer on a front side as viewed from the laser entry face side according to progress of recording operation.

5. The recording management apparatus according to claim 1, wherein the control unit sets, as the track setting processing, at least a management information track to record management information, a user data track to record user data, and a mirror track to record mirror data of the management information.

6. The recording management apparatus according to claim 5, wherein the control unit sets a plurality of tracks so that each of the management information track in each of the plurality of layers, the user data track in each of the plurality of layers, and the mirror track in each of the plurality of layers are overlapped in an incident light axial direction of a laser beam.

7. The recording management apparatus according to claim 1, wherein the control unit sets the recording medium to a state managed with a multisession configuration, and wherein session closing processing is executed for each of the plurality of layers.

8. The recording management apparatus according to claim 1, wherein the control unit performs session closing processing in order from a layer of the plurality of layers serving as a rear side as viewed from the laser entry face side.

9. The recording management apparatus according to claim 1, wherein the control unit performs the recording of information by the laser irradiation on the first layer, the first layer being a rear-most layer of the plurality of layers as viewed from a laser entry face side.

10. A recording management method comprising:
    performing track setting processing to set a first plurality of tracks serving as continuous recording areas to a first layer of a plurality of layers serving as recording layers of a recording medium,
    wherein recording of information on the recording medium is performed by laser irradiation; and
    performing closing track processing to set one track of the first plurality of tracks to a continuous recording completed state within the first layer before setting a second plurality of tracks in a second layer of the plurality of layers for recording the information.

11. The recording management method according to claim 10, wherein each of the first plurality of tracks is set to the continuous recording completed state in the first layer before setting a corresponding track in the second layer for recording the information.

12. The recording management method according to claim 10, further comprising recording each of a management information track, a user data track, or a mirror track sequentially by overlapping each of the management information track, the user data track, or the mirror track in each of the plurality of layers in an incident light axial direction of a laser beam.

13. A non-transitory computer-readable storage medium having stored thereon, a computer program having at least one code section for processing, the at least one code section being executable by a computer for causing the computer to perform steps comprising:
    performing track setting processing to set a first plurality of tracks serving as continuous recording areas to a first layer of a plurality of layers serving as recording layers of a recording medium,
    wherein recording of information on the recording medium is performed by laser irradiation; and
    performing closing track processing to set one track of the first plurality of tracks to a continuous recording completed state within the first layer before setting a second plurality of tracks in a second layer of the plurality of layers for recording the information.

* * * * *